US011663271B1

(12) United States Patent
Faynburd et al.

(10) Patent No.: US 11,663,271 B1
(45) Date of Patent: May 30, 2023

(54) SERVERLESS SEARCH USING AN INDEX DATABASE SECTION

(71) Applicant: Fast Simon, Inc., Los Altos, CA (US)

(72) Inventors: Alexandra Faynburd, Haifa (IL); Adar Greenshpon, Haifa (IL)

(73) Assignee: Fast Simon, Inc., Los Altos, CA (US)

( * ) Notice: Subject to any disclaimer, the term of this patent is extended or adjusted under 35 U.S.C. 154(b) by 201 days.

(21) Appl. No.: 16/601,474

(22) Filed: Oct. 14, 2019

Related U.S. Application Data

(60) Provisional application No. 62/749,341, filed on Oct. 23, 2018.

(51) Int. Cl.
*G06F 16/903* (2019.01)
*G06F 16/9538* (2019.01)
*G06F 16/901* (2019.01)

(52) U.S. Cl.
CPC .... *G06F 16/90348* (2019.01); *G06F 16/9027* (2019.01); *G06F 16/9538* (2019.01)

(58) Field of Classification Search
CPC ........... G06F 16/90348; G06F 16/9027; G06F 16/9538
See application file for complete search history.

(56) References Cited

U.S. PATENT DOCUMENTS

| | | | | |
|---|---|---|---|---|
| 7,013,304 B1 * | 3/2006 | Schuetze | ............... | G06F 16/955 707/E17.112 |
| 9,697,281 B1 * | 7/2017 | Palmon | ................. | G06F 16/951 |
| 2003/0061189 A1 * | 3/2003 | Baskins | ............... | G06F 16/9027 |
| 2008/0208850 A1 * | 8/2008 | Boyce | ................ | G06F 16/90344 |
| 2011/0270820 A1 * | 11/2011 | Agarwal | ............... | G06F 40/253 707/709 |
| 2012/0330944 A1 * | 12/2012 | Vailaya | ................. | G06F 16/245 707/723 |
| 2013/0080440 A1 * | 3/2013 | Wyle | ....................... | G06F 16/93 707/741 |
| 2017/0212680 A1 * | 7/2017 | Waghulde | ............. | G06F 3/0644 |

OTHER PUBLICATIONS

Krol et al., "NFaaS: Named Function as a Service" Proceedings of ICN 2017 pp. 134-144 (Year: 2017).*

* cited by examiner

*Primary Examiner* — Mark D Featherstone
*Assistant Examiner* — Kweku William Halm
(74) *Attorney, Agent, or Firm* — Dov Rosenfeld; Inventek

(57) ABSTRACT

One embodiment included a non-transitory machine-readable medium containing instructions that when executed carry out a method of searching for a search term. The method uses, instead of an index database of search terms, an index database section of only search terms that have the prefix of the search term, such that execution can occur on an improved processing system that is relatively small. The index database section is arranged as a prefix database of terms that start with the prefix, e.g., a trie, a radix trie, or a ternary search tree of the terms. The method may be implemented as a serverless function triggered by a user entering a search term or part thereof.

23 Claims, 9 Drawing Sheets

US 11,663,271 B1

SERVERLESS SEARCH USING AN INDEX DATABASE SECTION

RELATED APPLICATION

This patent application claims benefit of priority of U.S. Prov. Pat. App. Ser. No. 62/749,341 filed 23 Oct. 2018 to inventors Faynburd et al., the contents of which are incorporated herein by reference.

FIELD OF THE INVENTION

The present disclosure relates generally to improving functioning of a computer for searching by organizing an index database into index database sections for storage efficiency, and using one of the database sections to implement a serverless search.

BACKGROUND

Search is a critical component for information access when browsing a website or an online catalog on a computing device that has a user interface, e.g., a computer or a mobile device such as a so-called smart phone, e.g., an iPhone or an Android phone.

It is known to search the Web, an online catalog, or a web page using an index database that is created by crawling the source of the information, e.g., the Web, the catalog, or the website and creating entries for search terms in the index database. A "search term" may be one or more words, e.g., a search phrase herein, and may contain alphanumeric characters, e.g., in one or more natural languages). Each index search term in the index database has associated with it the information the index search term refers to, e.g., the URL of a web page or information about an item in a catalog. Once the index database is created, a user at a user interface searches by entering a search term of one or more words in a search box in the user interface, which causes the index to be searched for a match. In some cases, the associated information for an index search term may include a summary of the web page, or a summary of the catalog content, such information when displayed to a user on a user interface providing for the user the ability to request to the associated web page or complete item information in the catalog. In some cases, responsive to a match, the user is directly provided with the associated web page or complete item information in the catalog.

It is known to structure the index database to facilitate an autocomplete function that provides to a user one or more suggestions (complete indexed search terms) as the user enters more and more characters in the search query. The set of suggestions may change as more characters are entered. For this, it is known to structure the index database in a particular format that makes such searching with autocomplete efficient. Such structures for the index database include a trie (also called a suffix tree) and a radix tree, which is a more efficient form of maintaining the information in a trie structure.

As the body of information being indexed becomes larger and larger, the size of the index database grows at a faster and faster rate, and can easily become too large to be stored in any single computer system.

Recently, so-called serverless functions and the infrastructure therefor have become available. A serverless function, also called function as a service (FaaS), is a data processing function that is automatically triggered by an event, and hosted by a third party service. There is need to provision resources such as servers, software therefor, and hardware to carry out the data processing of the function. This and the scaling occur automatically. It is desired to design such functions to be inclusive of the data needed to carry out the application. For example, it is desired to design such a function to carry out a search using an index database. For this, it is desirable for the index database to be small so that it can be included with the function.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DESCRIPTION OF EXAMPLE EMBODIMENTS

Figure 1:
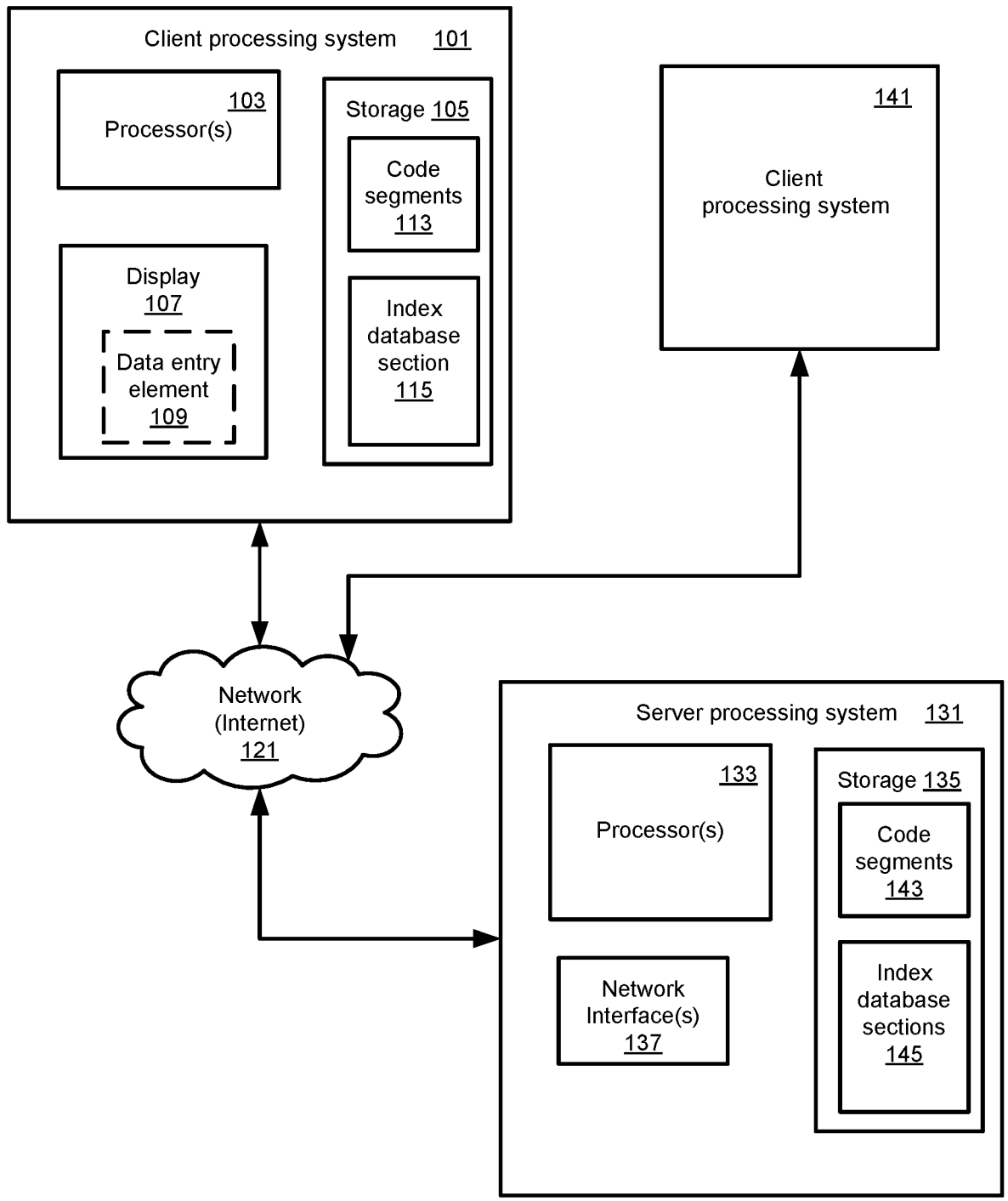
FIG. 1 shows a simplified block diagram of an example client server system on which some embodiments of the invention operate and which include embodiments of the present invention.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be used without departing from the principles described herein.

Overview

Particular embodiments include a machine-implemented method comprising accepting a search term from a user interface into which a user enters a search term, and determining an index section to load for searching, the determining according to the prefix of the search term, the index section being one of a plurality of index sections, each index section containing all terms having a corresponding prefix of at least two characters, at least one corresponding prefix having at least three characters, each index section arranged as a prefix database of terms that start with the corresponding prefix, the corresponding prefixes of the plurality of index sections comprising all possible prefixes that may be searched. The method further includes loading the determined index section; carrying out a search for the search term using the loaded index section to produce search results; and causing presenting to the user (via the user interface) the results of the search for the search term.

Some autocomplete versions include entering the search term by the user one character at a time so that there is a so-far entered prefix accepted, and prior to the search for the search term, searching for all search terms having the so-far entered prefix, and causing presenting to the user at least some of the search terms having the so-far entered prefix such that the user can select the search term from the presented search terms.

In some versions, the method further comprises:
ascertaining whether the determined index section is larger than a predefined size;
in response to the ascertaining that the index section is larger than the predefined size, partitioning the determined index section into index subsections, each index subsection containing all terms from the determined index section that have a corresponding prefix of more characters than the corresponding prefix of the determined index section; and
determining an index subsection to load for searching, the determining according to the prefix of the search term, In such versions, the loading loads the determined index subsection, and the searching for the search term uses the loaded index subsection.

Some versions of the method further comprise storing the index subsections as additional index sections.

In some versions, at least one of the prefix databases of terms has the structure of a trie. In some particular versions, at least one of the prefix databases of terms has the structure of a radix trie.

In some versions of the method, the steps of the method form a serverless function triggered by the user entering the search term (or in the autocomplete versions) each character of the search term. The serverless function is loaded into a serverless function provider.

Particular embodiments of the invention include a non-transitory machine-readable medium containing instructions that when executed by one or more processors of a processing system carry out any of the above-described methods.

Particular embodiments of the invention include a data processing system comprising one or more processors; and one or more storage subsystems. At least one of the storage subsystems comprises code that when executed causes at least one of the processors to accept a search term from a user interface into which a user enters a search term. At least one of the storage subsystems comprises code that when executed causes at least one of the processors to determine an index section to load for searching, the determining according to the prefix of the search term, the index section being one of a plurality of index sections, each index section containing all terms having a corresponding prefix of at least two characters, at least one corresponding prefix having at least three characters, each index section arranged as a prefix database of terms that start with the corresponding prefix, the corresponding prefixes of the plurality of index sections comprising all possible prefixes that may be searched. At least one of the storage subsystems comprises code that when executed causes at least one of the processors to load the determined index section. At least one of the storage subsystems comprises code that when executed causes at least one of the processors to carry out a search for the search term using the loaded index section to produce search results. At least one of the storage subsystems also comprises code that when executed causes at least one of the processors to present to the user (via the user interface) the results of the search for the search term.

Some autocomplete versions include entering the search term by the user one character at a time so that there is a so-far entered prefix accepted by at least one processor executing code in at least one of the storage subsystems. At least one of the storage subsystems comprises code that when executed causes at least one of the processors, prior to the search for the search term, to search for all search terms having the so-far entered prefix, and to cause presenting to the user at least some of the search terms having the so-far entered prefix such that the user can select the search term from the presented search terms.

In some versions, at least one of the storage subsystems further comprises:
code that when executed causes at least one of the processors to ascertain whether the determined index section is larger than a predefined size;
code that when executed causes at least one of the processors, in response to the ascertaining that the index section is larger than the predefined size, to partition the determined index section into index subsections, each index subsection containing all terms from the determined index section that have a corresponding prefix of more characters than the corresponding prefix of the determined index section; and
code that when executed causes at least one of the processors to determine an index subsection to load for searching, the determining according to the prefix of the search term.

In such versions, the code that when executed causes at least one of the processors to load loads the determined index subsection, and the search for the search term uses the loaded index subsection.

In some such versions, at least one of the storage subsystems further comprises code that when executed causes at least one of the processors to store the index subsections as additional index sections.

In some versions, wherein at least one of the prefix databases of terms has the structure of a trie. In some particular versions, at least one of the prefix databases of terms has the structure of a radix trie.

In some versions, the above-described code forms a serverless function that is executed upon the user entering the search term (or in the autocomplete versions, a character of the search term). The serverless function is loaded to a serverless function provider and executed by a processing system of the serverless function provider upon the triggering event occurring.

These embodiments cause a processing system to be more efficient by configuring the database being searched for search terms or answers to a search term to be smaller, e.g., as small as 10 MB or even 1 MB, thus cause the processing system to be more efficient, and/or cause the processing system to carry out relatively small serverless functions for searching.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

Some Example Embodiments

As used herein, using search for information retrieval involves searching for a search term which uses words in one or more languages. The basic units constitute vocabulary of all possible search terms. Based on this vocabulary one can create all kinds of information. There are many other names for these basic units: word, term, jargon, terminology, concept, entity, name, noun, etc. While in this description, the vocabulary is assumed have an alphabet of alphanumeric characters in the one or more languages, the invention may also be used for searching non-natural language vocabularies for which the alphabet may not only include alphanumerical characters, but also symbols, sounds, etc. Thus, for example, the search terms of a non-natural language vocabulary need not have meaning in any natural language. Examples include catalog identifiers (e.g., SKUs) that may include symbols in combination with alphanumeric characters, terms that may include numeric dates, and so forth.

A corpus is a collection of information, for example a collection of articles, books, product descriptions, etc. It is desired to conduct searching on the corpus using a search term which may be part of a word, a word.

Searching as used herein involves forming an index database. The corpus is crawled to form a vocabulary for the corpus, and the vocabulary is indexed to form an index database. A simple crawling method is to collect all words in one or more languages, e.g., all English words from all documents in the corpus, and add them to a set. In the set, all items are unique, there is no duplication. For example, all documents may contain the word "the," probably occurring many times, but in the final set, there is only one item for "the". The resulting set is the vocabulary of the corpus. This is a very usual vocabulary.

Another example is Google®. The corpus is the whole Internet, and Google also built the vocabulary for the corpus.

Index Database Structures

Several types of index database structures are known. One broad type of index database structure that helps include an autocomplete function in a search is called a prefix index database of terms. An autocomplete function typically includes displaying suggestions for a user on a user interface as more and more characters of a search term are entered by the user, so that the user may select one of the suggestions as the search term rather than having to input all the characters of the search term.

Embodiments of the present invention use parts of prefix index databases for searching.

One such prefix index database is a trie (also called a prefix tree) which has the structure of a tree having labeled unidirectional edges, each label being a character of the alphabet, with the root node having as its edges all the first characters of the terms in an alphabet, these edges leading to nodes that have as edges to respective next nodes the second characters of terms in the alphabet, and so forth until the leaf nodes of the tree are reached, each such leaf node corresponding to a term in the vocabulary. Each node in a trie represents a prefix of those terms that are the node's eventual leaf node children. The set of leaf nodes correspond to the vocabulary of possible search terms. For an alphanumeric English alphabet starting with a letter, the root node potentially has 26 edges. Of course for an alphabet whose first letter can be a number and/or other alphabets, the root may have more or fewer edges.

The nodes of the trie structure (representing the so-far prefix or a complete search term) may each point to additional information in the index database related to the search term, for example, the full title of a document, the URL of a Web-based document, an excerpt of the document, and so forth. In one embodiment, such additional material forms more fields for the node.

Figure 6A:
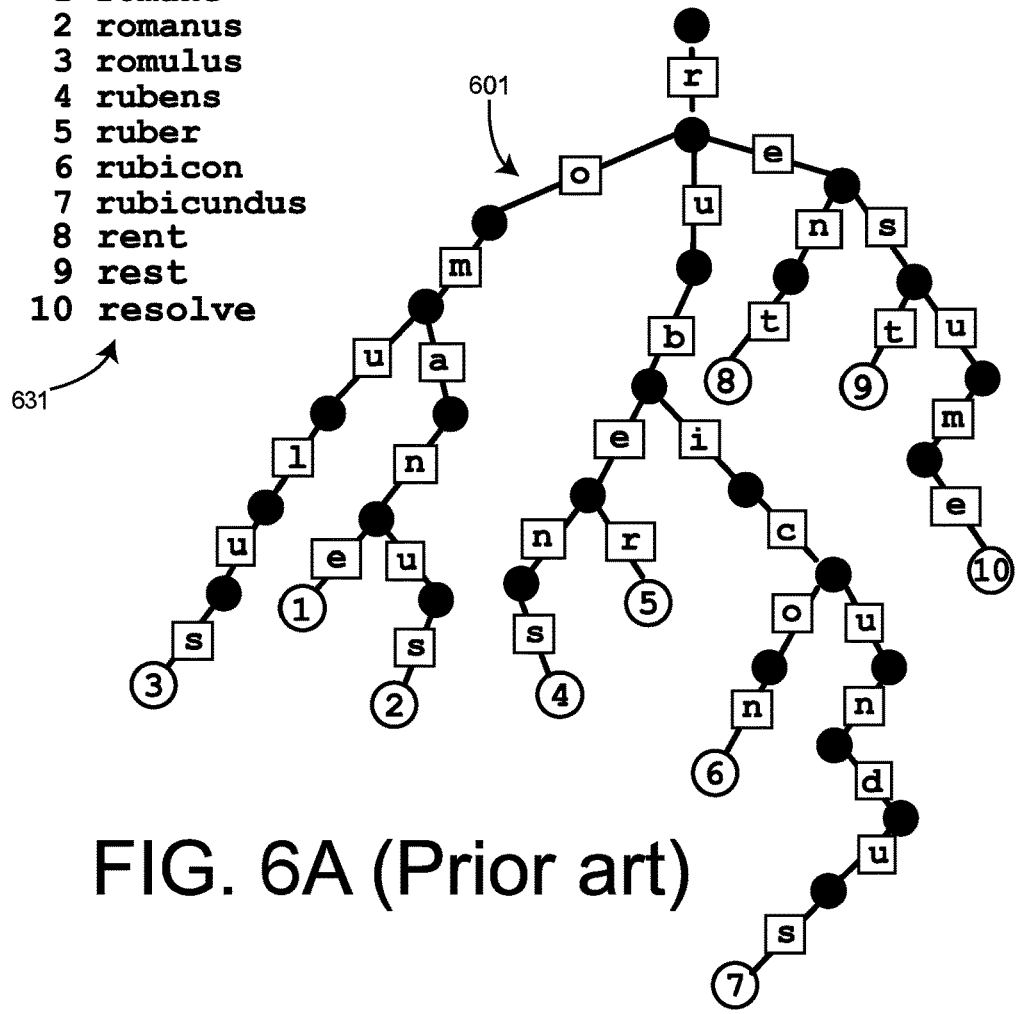
FIGS. 6A and 6B illustrate a simple example trie index database structure and radix trie index database structure, respectively, of a vocabulary.

FIG. 6A shows an example of a trie 601 structure of an index database for the example vocabulary 631 consisting of 10 possible search terms (labeled 1 through 10) all of which start with the letter "r." The root node of the trie therefore has only one edge, labeled "r" leaching to a node that has three edges labeled "o", "u", and "e" corresponding to search terms that start with "ro", "ru", and "re", respectively. In this manner trie 601 is structured to reach the 10 leaf nodes corresponding to words 1 through 10.

It is assumed herein that how to construct such a trie after crawling a corpus is known, so is not part of the inventive aspects described herein.

Note that this trie 601 for just these 10 words all starting with the letter "r" has 36 nodes (including the 10 leaf nodes) and 35 edges. In a practical situation, the size, and therefore the storage space needed for a trie can be large. The requirements for storing such a trie can quickly become prohibitive for a small processing system, e.g., a mobile device or a small private server, or for a small serverless function with limited memory. One aspect of embodiments of the invention is to reduce the storage space required for storing an index database by breaking up a trie into trie sections that are each smaller in size.

Another prefix database structure that can be used for searching with the providing of an autocomplete function is a radix trie, also called a radix tree. A radix trie is a space-reduced representation of a trie in which each node that is an only child of a parent node is merged with the parent node. Edges thus can be labeled with sequences of characters, not just single characters. As with a trie, each node in a radix trie represents a prefix of those terms that are the node's eventual children. Radix tries are much more efficient for small alphabets (especially if the terms are long) and for sets of terms that share long prefixes.

Figure 6B:
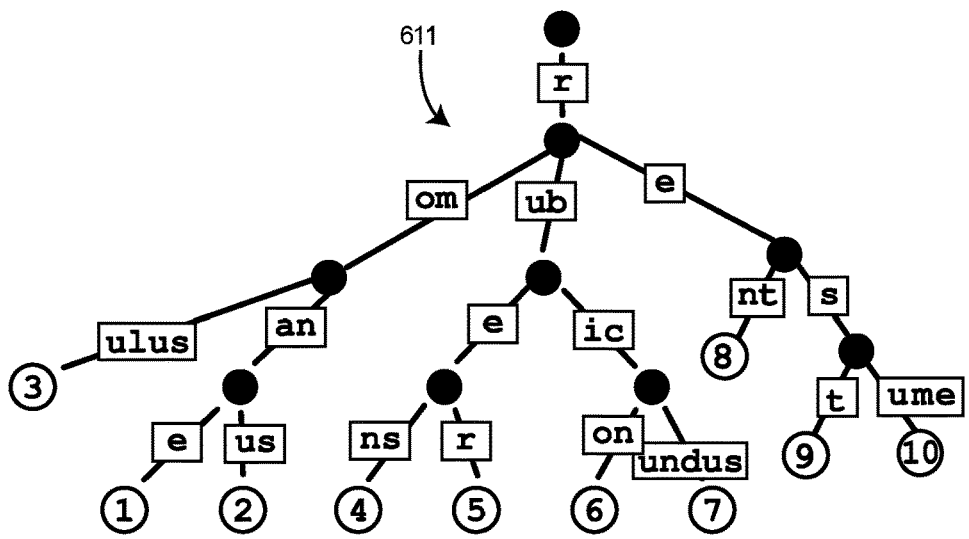

FIG. 6B shows a radix trie 611 of the same vocabulary 631 of words that start with an "r." Note that the internal edge sequence "o" and "m" from trie 601 is replaced with a single edge "om." similarly with other internal nodes that have only one child node.

It is assumed that how to construct a radix trie, e.g., from a trie after crawling a corpus is known, so not part of the inventive aspects described herein.

Another aspect of embodiments of the invention is to reduce the storage space required for storing an index database by breaking up a radix trie into radix trie sections that are each smaller in size, so that any of the radix trie sections can fit in a small processing system, e.g., a mobile device or a small private server or in a small serverless function with limited memory.

Another prefix database structures that can be used for searching include a ternary search tree, where each node represents a character in the alphabet, and nodes are arranged with edges (pointers) to up to three children. Three possible edges (pointers) that point to the next character of a search term point to the left child node, the right child node, or the middle child node. A search is carried out character by character by traversing nodes until the search term is reached. Each node represents a so-far entered character of a term. The search continues to the next character. If the search character is less that the current node's character, the search goes to the left child; if the search character is greater, the search goes to the right child. When the search character is equal, though, the search goes to the middle child, and proceeds to the next character in the search string. The aspects of the invention is to reduce the storage space required for storing an index database may also be applied to ternary search trees. How to modify the methods and systems described herein would be straightforward to one of ordinary skill in the art.

Two main sets of embodiments are described herein. The first set of embodiments includes a search carried out in a client-server environment. The second set of embodiments include a search carried out in a client processing system which forms an event-driven serverless function triggered by accepting a search term or part thereof.

Client-Server Architectures

FIG. 1 shows one embodiment of an environment on which some embodiments of the invention operate. Such embodiments include aspects of operating a client device, also called a client processing system 101 that includes one or more client processors 103, client storage 105 including a memory, a display 107 coupled to at least one client processor, a network interface to couple the client device 101 to a network 140, and a data entry element 109 that includes a character input mechanism, which may take the form of a physical key pad, physical keyboard, a virtual keyboard in the form touch sensitive display of a keyboard, or some other mechanism for a user to enter characters. The client device includes software (program instructions; code segments) 113 that when executed on one or more of the processors 103, cause the client processing system 101 to carry out a client-side process that includes aspects of client-server embodiments of the present invention. The client-side process in some versions includes elements that operate on a browser process, which in some versions may be part of the operating system software.

One or more other client processing systems may be included in the client server system, and one such other client 141 is shown.

The data entry element 109 of the client processing system further includes a selection mechanism for the user to enter a user selection at a particular location on the screen. Examples of selection mechanisms include a physical pointing device such as a mouse, touchpad, pen, or trackball to point to the location on the display, with a button to click. Examples also include a touch sensitive display. Examples of a client processing systems include without limitation a "smart phone," a tablet, a laptop computer, a desktop computer, or some other client device.

The client processing system 101 is coupled directly or via a network 121 to a server processing system 131 that includes one or more server processors 133, and storage 135 coupled to the one or more server processor 133, the storage including memory and one or more other storage elements. The storage element 135 include instructions 143 that when executed by at least one processor 133, cause the server processing system 131 to carry out a server-side process of the client-server embodiments. The server processing system is coupled to or comprising a source of websites. The coupling is in one embodiment is the Internet, and in an alternate embodiment, is an Intranet coupled to servers storing websites.

Note that the server processing system 131 may be a distributed system that includes several servers coupled by the same network 121 or another network, and may include elements that are replicated at several locations. Furthermore, as would be clear to those skilled in the art, there may be a distinct server processing system in communication with the client processing system that in combination with the client processing system, carries out search (with autocomplete) aspects of client-server embodiments of the present invention, and another server processing system for serving web pages of websites. All such server processing systems are, for simplicity of explanation, shown as the single server processing system 131. Furthermore, some of the operations of the server processing system may be carried out in the cloud by a cloud provider providing a computing platform for hosting applications, known as Platform as a Service (PaaS); and/or providing an entire networking or computing infrastructure, known as Infrastructure as a Service (IaaS). Such also is shown herein for simplicity as the single server processing system 131.

Aspects of the invention may operate upon a user interacting with a web page displayed on display 107 by a browser operating on the client 101, or by a user interface served to the client system 101 by the server processing system 131. The client processing system 101 further includes a mechanism to accept a user selection, e.g., by the user clicking on a location displayed on the display 107, e.g., by using a pointing device such as a mouse, a touchpad, pen, or trackball to point to the location on the display, or by touching the display 107 in embodiments in which the display 107 includes a touch sensitive surface. Note, as is known in the art, the data entry element 109 may include a voice entry mechanism.

In much of the description of the client-server embodiments, per FIG. 1, the coupling between the client system 101 and server system 131 is a network 121, e.g., a private network or a public network such as the Internet, a cellular data communication system, or a combination of the Internet and a cellular data communication system. In the description, unless otherwise stated, the network 121 is the Internet. The client-server embodiments of the invention, however, are not so limited, and in alternate such embodiments, the link between the client system 101 and server system 131 is a private network, or a direct link.

Figure 3A:
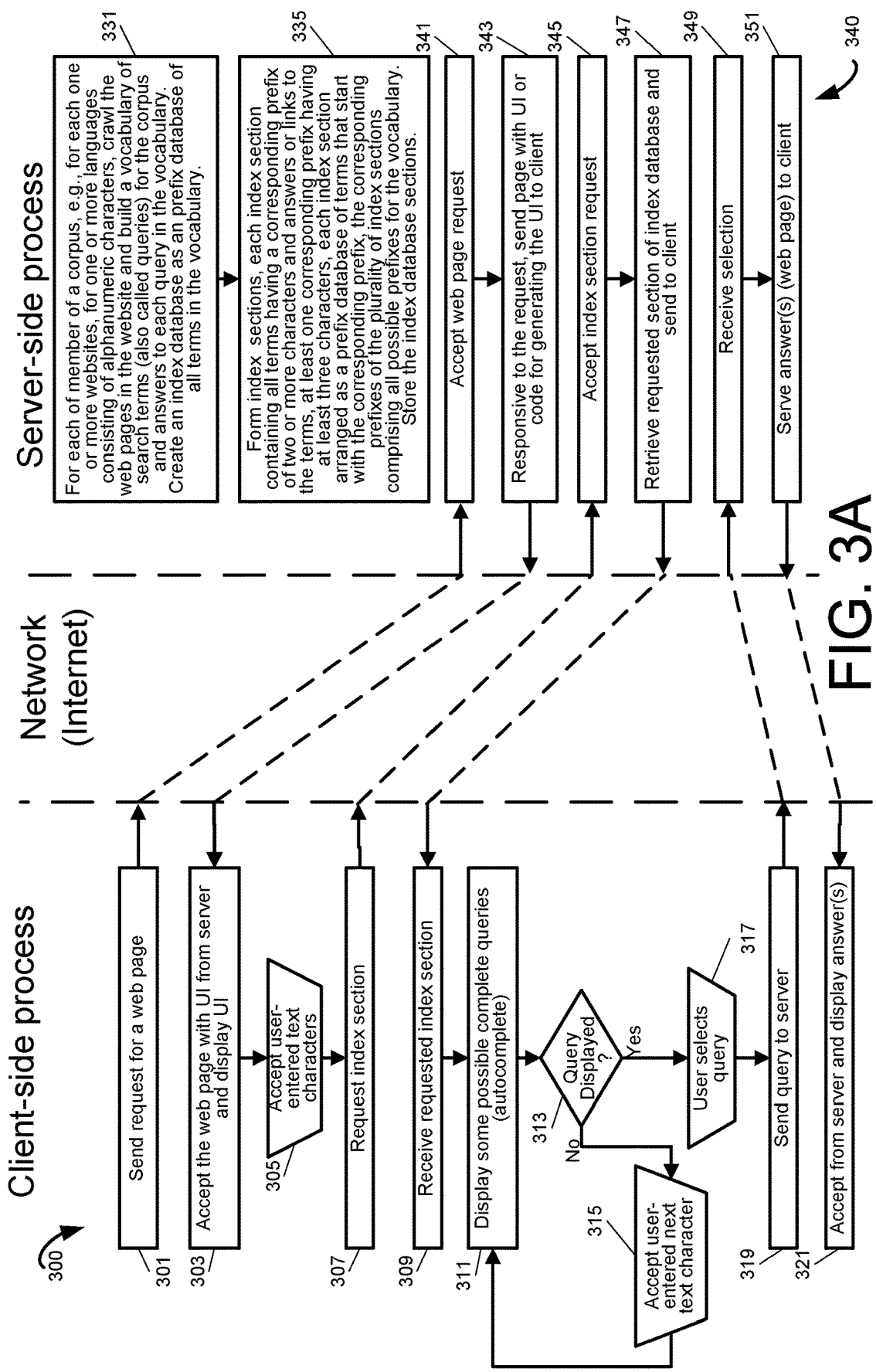
FIG. 3A shows a simplified flowchart of a client-side process and a server-side process linked by a network, according to a first client-server embodiment of the invention.

FIG. 3A shows a simplified flowchart of first versions of a client-side process 300 and server-side process 340 linked by the network 121, according to a first client-server embodiment of the invention. This embodiment, for example, is suitable for a system in which a search function is carried out mostly in the client processing system.

It is assumed that the server-side process 340 (or some other separate process) carried out on the server processing system 131 (or some separate processing system) preprocessing process of steps 331 and 335 comprising, in 331, for each of member of a corpus of interest, e.g., for each of one or more websites that comprises one or more web pages, for one or more languages consisting of alphanumeric characters, crawling the web pages in the website and building a vocabulary of search terms (also called queries) for the corpus and one or more answers to each query in the vocabulary. Each answer may be a web page or a part thereof, e.g., for example a subsection, a paragraph, an image, or some other portion of a web page, which could be considered an answer to the search term. Each answer is associated, e.g., may be labeled with the search term. Furthermore, answers may be ranked according to relevance to the search term. An answer furthermore may have a context, by which is meant a parent answer, such as the title of the parent page, or some other property. Preprocessing step 331 includes creating an index database that is in the form of a prefix database of search terms, and that includes each search term and may include database fields in each record for the search term. Such fields may include the one or more answers for the search term, the ranks of the answers, and may include the contexts for answers, and may include such fields as prices, dates, and so forth.

The present invention does not depend on any particular method of crawling a corpus and creating a prefix database of all search terms, and any method may be used.

In step 335, the index database is partitioned into index database sections, each index database section containing all queries having a corresponding prefix of two or more characters (and the field(s) for each query), at least one corresponding prefix having at least three characters. Each index section is arranged as a prefix database of search terms that start with the corresponding prefix, the corresponding prefixes of the plurality of index database sections comprising all possible prefixes for the vocabulary. The index database sections are stored and maintained as element 145 in the storage subsection 135 of the server processing system 131.

Not shown and not discussed herein are such maintenance tasks as adding and deleting search terms and related fields to and from the prefix databases. Such prefix database maintenance tasks are known to those of ordinary skill in the art.

Also not described herein is the need to re-partition a particular section responsive to ascertaining that adding one or more search terms to the particular section would exceed a predetermined size limit for index database sections.

Note that the partitioning of the index database may not be a separate step, such that step 331 directly forms the set of index database sections 145.

For purposes of example, it is assumed that the client-side process 300 (part of code segments 113) starts with step 301 of requesting a web page on which to carry out a search from the server processing system 131, which in step 341 is accepted by the server 131. Responsive to the accepted request, step 343 sends the requested page to the client-side process 300. In one embodiment, step 343 includes integrating at least one search user interface (UI) element ("search UI") such as at least one search box into the web page, through the addition of code, e.g., JavaScript code that when executed, cause the search box to be part of a web page of the website when displayed using a client browser on the display 107 of the client processing system 101.

The client-side process in 303 receives the web page (with the search UI or indication) and displays the web page with the search UI.

In 305, the user enters and process 300 accepts, one by one, characters of a query in a search box of the search UI.

In 307, as soon as a prefix of is accepted, the index database section for the accepted prefix is requested from the server-side process 340 where it is received and accepted in 345. Note that in the case that the first character does not define a corresponding prefix, step 345 requests from the server-side process that steps 305 and 307 be repeated until enough characters that define an index database section are available at step 307, and sent to be received by the server-side process.

Step 345 includes, responsive to the request for the index database section, retrieving the requested section from 145 in storage 135, and sending the requested index database section to the client-side process 300, wherein in 309 it is received and accepted.

In step 313, in some embodiments even after only the initial prefix defining the index database section, possible complete search terms with the so-far entered prefix are displayed for the user on the display 107.

The user decides (313) whether the desired search term is one of the ones displayed. If not, the user enters the next character which is accepted in 315 and the client side process returns to 311 where possible complete search queries are displayed. Eventually, either the complete query is entered, or the user recognizes and in 317 selects the complete query.

In one version, in 319, the client-side process 300 sends the selected search term to the server-side process. The server-side process 340 in 349 accepts the selected query, and in 351 looks up the selected search term in the appropriate index database section to obtain the answer(s) and any context(s), e.g., the answer may be a web page, and serves the answers and any contexts to the client-side process. The answer also may be a catalog item in the case of the corpus being a catalog of items.

In 321 the client-side process receives and displays the answers, e.g., the web pages and any contexts to the user. From these answers the user may select a particular web page or website and request to view that web-page or website.

Note that once an index search term is found, the user may conduct further searches based on the fields in the index database. For example, in the case of a catalog, once a search term is identified and the answer(s) displayed, the user may conduct a further search for different attributes stored in the fields of the index database for the identified search term. Thus, a user may look for items within a range of prices, items that have a range of dates associated, and so forth.

Note that one feature of embodiments of the invention is that rather than using a complete index database, only an index database section is searched. Each database index section can be significantly smaller than the complete index, making it possible, for example, to store and search the complete index database section in only the client processing system, e.g., in the memory portion of the storage subsection 105.

Furthermore, while FIG. 3A shows that the user selection of the complete search term is sent in 315 to the client-side process to look up the corresponding answers and any contexts, the relatively small size of the index database section may enable the complete index database section, including all fields of any entry to be sent to the client-side process in step 343 and received in 309. In such an embodiment, once the complete search term is identified in the client-side process, there is no need to send the selection to the server-side process. The client processing system has, and can look up the associated answer(s) and any context(s), and display these to the user.

Figure 3B:
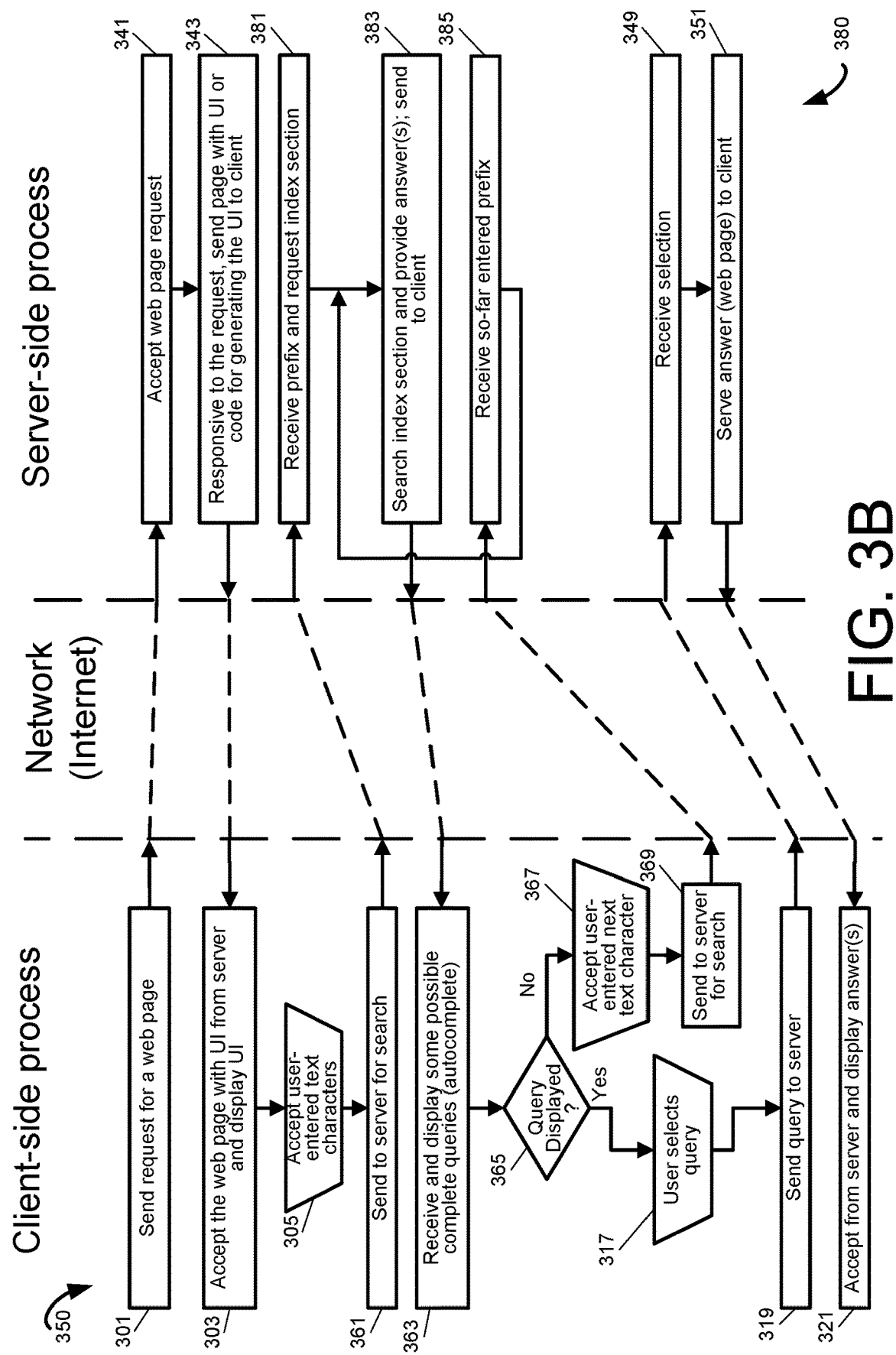
FIG. 3B shows a simplified flowchart of different client-side and server-side processes according to a second client-server embodiment of the invention.

FIG. 3B shows a simplified flowchart of second versions of a client-side process 350 and server-side process 380 linked by the network 121, according to a second client-server embodiment of the invention. This embodiment, for example, is suitable for a situation where the server system is limited, which may occur for example if a vendor is running its own server. In this case, the lookup and retrieval of the index database section and the search steps (e.g., above-described 307 and 309) are carried out in the server processing system. Network 121 in this situation may be a private intranet, and the server may further be coupled to a large independent storage system which can store all the index database sections, e.g., may be coupled via the Internet to an online server. This type of embodiment may also be suitable for the case of carrying out the search on the server completely in-memory once the index database section is retrieved from storage where all sections are stored, which may be in the server processing system, or may be, e.g., in a different server or in the cloud.

As for the case of FIG. 3A, it is assumed that the pre-processing steps 331 and 335 (FIG. 3A) have already been carried out so that index database sections have been stored as 145 in the server processing system or elsewhere but retrievable by the server processing system. Thus it is assumed that a set of index database sections is available, each index database section containing all queries having a corresponding prefix of two or more characters (and the field(s) for each query), at least one corresponding prefix having at least three characters, with each index section being arranged as a prefix database of search terms that start with the corresponding prefix, the corresponding prefixes of the plurality of index database sections comprising all possible prefixes for the vocabulary. Again, not shown and not discussed herein are such maintenance tasks as adding and deleting search terms and related fields to and from the prefix databases. Such prefix database maintenance tasks are known to those of ordinary skill in the art. Also not described herein is the need to re-partition a particular section responsive to ascertaining that adding one or more search terms to the particular section would exceed a predetermined size limit for index database sections.

For purposes of example, it is assumed that the client-side process 350 starts with the same step 301 as FIG. 3A of requesting a web page on which to carry out a search from the server processing system 131, which in step 341 is accepted by the server 131. Responsive to the accepted request, step 343 sends the requested page (with a search UI) to the client-side process 350. The client-side process in 303 receives the web page (with the search UI or indication) and displays the web page with the search UI.

In 305, the user enters and client-side process 350 accepts, one by one, characters of a query in a search box of the search UI. Step 361 includes sending the so-far entered character(s) to the server-side process 380. The server side process in 381 retrieves (or attempts to retrieve) the index database section for the so-far accepted characters. If no prefix has yet been received, e.g., only one character has been input by the user, and there is no one-character corresponding prefix for any of the index database sections, the server side process sends an indication to the client side process to repeat steps 305 and 361 until a corresponding prefix is received in step 381, responsive to which step 381 requests the index database section for the accepted prefix. Server-side step 383 searches the index database section (even after only the initial prefix defining the index database section) and in 383 obtains possible complete search terms with the so-far entered prefix, which at this stage are answers. These one or more answers are sent to the client-side process.

In step 363, the client-side process 350 displays the answers for the so-far entered query on the display 107. The user decides (step 365) whether the desired search term is one of the ones displayed. If not, the user enters the next character which is accepted in 367 and the client side process send the so-far entered query to the server-side process in step 369.

The server-side process 380 receives the so-far-entered query in 385 and then returns to 383 where once again possible complete search queries are retrieved and sent to the client-side process 350 for display to the user. The loop of steps 365, 367, 369, 395, 383, and 363 are repeated until eventually, either the complete query is entered, or the user recognizes in 365 and in 317 selects the complete query.

In one version, as in FIG. 3A, in 319, the client-side process 350 sends the selected search term to the server-side process. The server-side process 380 in 349 accepts the selected query, and in 351 looks up the selected search term in the appropriate index database section to obtain the answer(s) and any context(s), e.g., the answer may be a web page, and serves the answers and any contexts to the client-side process. The answer also may be a catalog item in the case of the corpus being a catalog of items.

In 321 the client-side process receives and displays the answers, e.g., the web pages and any contexts to the user. From these answers the user may select a particular web page or website and request to view that web-page or website.

Note that, as in the case of the embodiments of FIG. 3A, once an index search term is found, the user may conduct further searches based on the fields in the index database. For example, in the case of a catalog, once a search term is identified and the answer(s) displayed, the user may conduct a further search for different attributes stored in the fields of the index database for the identified search term. Thus, a user may look for items within a range of prices, items that have a range of dates associated, and so forth.

While FIGS. 3A and 3B include the autocomplete functionality, in alternate embodiments of the invention, no autocomplete is included, and the client-side process searches the received index database section in one go for the complete search term. The advantages of having relatively small index database sections are still obtained in such alternate embodiments.

Thus, the use of relatively small index database provides increased functionality to the computer, e.g., the client processing system, enabling faster searches, and enabling complete searches to be carried out in the one computer system.

Serverless Functions and FaaS (Functions as a Service) Providers

The second set of embodiments include a search carried out in the cloud by an event-driven serverless function triggered by accepting a search term or part thereof in a client processing system. The serverless function is programmed by a developer on a developer processing system and uploaded to a cloud computing provider that also acts as a serverless function provider (also called FaaS (Function as a Service) provider) in the cloud. These embodiments of the invention are not limited to any particular cloud provider or serverless function provider. There are (in 2018) many cloud providers, including without limitation: Google Cloud Platform™ by Google, Inc. of Mountain View, Calif., USA; Amazon Web Services (AWS™) by Amazon, Inc. of Seattle, Wash., USA; Azure™ by Microsoft Inc., of Redmond, Wash., USA; IBM Cloud™ from IBM of Armonk, N.Y., USA; and many others. Google calls its serverless functions "Google Cloud Functions," AWS calls its serverless functions Lambda™ functions, IBM calls its functions "IBM Cloud Functions," the Apache Software foundation calls its serverless infrastructure Apache OpenWhisk, Microsoft calls its serverless functions "Azure Functions." Providing serverless functions is known today (2018) as providing FaaS (Functions as a Service). Thus, a serverless function provider is also called an FaaS provider herein. The serverless function aspects of the invention are not limited to any particular FaaS provider or providers.

Triggering by a pre-defined event, e.g., by accepting of a search term or part thereof in some embodiments of the invention, causes the function, including code to carry out a search in the serverless embodiments of the invention, to be executed in the cloud (on a processing system operated by the FaaS provider) without the need to provision compute resources such as servers, storage, and so forth. That is, serverless technology provides for running code without provisioning or managing servers. With serverless technology, one can run code for virtually any type of application or backend service, all with zero administration, e.g., without managing one's own server, and without managing one's own long-lived server applications. One, e.g., a developer working on the developer processing system that is coupled to a cloud service that provides FaaS, uploads code, e.g., a first code set to carry out a first function including the autocomplete function that provides for a user on a client processing system a mechanism to select a search term, a second code set for a second function configured to retrieve the answers for the search term, and the FaaS provider takes care of everything required to run and scale the two code sets with high availability. Once the functions' code sets are uploaded, the FaaS provider does everything else necessary, including provisioning resources, instantiating virtual machines (VMs), managing processes, etc., to carry out each of the functions when responsive to the respective triggering. Horizontal scaling is completely automatic, elastic, and managed by the FaaS provider, so that, for example, if a system needs to be processing 100 requests in parallel, the FaaS provider handles that without any extra configuration on the programmer's part. The compute containers for the executing of the functions are ephemeral, with the FaaS provider creating and destroying them purely driven by runtime need. The FaaS provider handles all underlying resource provisioning and allocation—no cluster or virtual machine management is required.

FaaS functions are regular applications when it comes to language and environment. For instance, with most providers, each of the functions can be implemented in, without limitation, JavaScript, Python, Go, any JVM language (Java, Clojure, Scala, etc.), or any .NET language.

Figure 2:
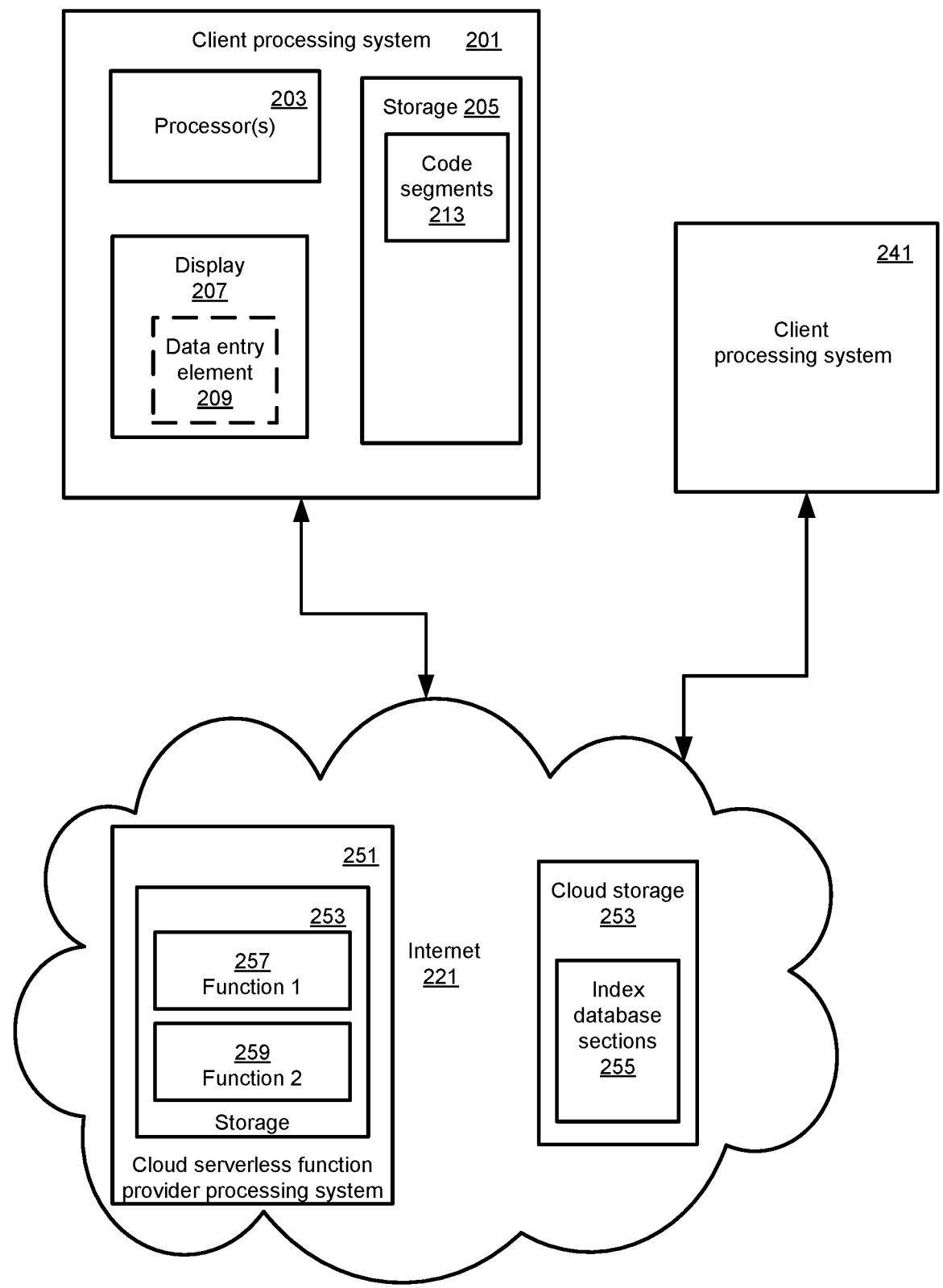
FIG. 2 shows a simplified block diagram of a different example system on which some embodiments of the invention operate and which include embodiments of the present invention.

FIG. 2 shows an example embodiment of a FaaS environment in which FaaS-based embodiments of the invention operate. Such embodiments include aspects of operating a client device, also called a client processing system 201 that includes one or more client processors 203, client storage 205 including a memory, a display 207 coupled to at least one client processor, a network interface to couple the client device 201 to the Internet 221, and a data entry element 209 that includes a character input mechanism. The storage subsystem 205 includes software (program instructions; code segments, code) 113 that when executed on one or more of the processors 203, cause the client processing system 201 to carry out a client-side process that includes client-side aspects of FaaS embodiments of the present invention. Other than the software 213, client-processing system may be the same as the client system 101 of FIG. 1. One or more other client processing systems may be included in the client server system, and one such other client 141 is shown.

A cloud serverless function provider exists in the cloud as part of the Internet. Although how the serverless function provider provides the functionality of its serverless function is not of concern to operation of embodiments of the invention, and may involve several virtual processors, which of course operate on real processing systems, for purpose of explanation and without loss of generality, in the serverless function embodiments of the invention, the cloud serverless function provider provides services (as FaaS) to the client processing system as a provider processing system 251 that included in storage 253 of the provider processing system 251 a first function (Function 1 257) triggered by the user entering a character of a search term into an input user interface and a second function (Function 2 259) triggered by the user entering selection of a complete search term into an input user interface. The code of each serverless function is assumed to be loaded into storage 253 of the provider processing system 251 operated by the FaaS provider. The first function 257 is configured to provide for a user to enter, with autocomplete functionality, a search term and a second function (Function 2 259) configured to provide for a user to select the complete search term and be provided with the answers for the complete search term. As part of the Internet 221, a cloud storage provider provides cloud storage 263 for storing index database sections 265 as described herein below.

Figure 4:
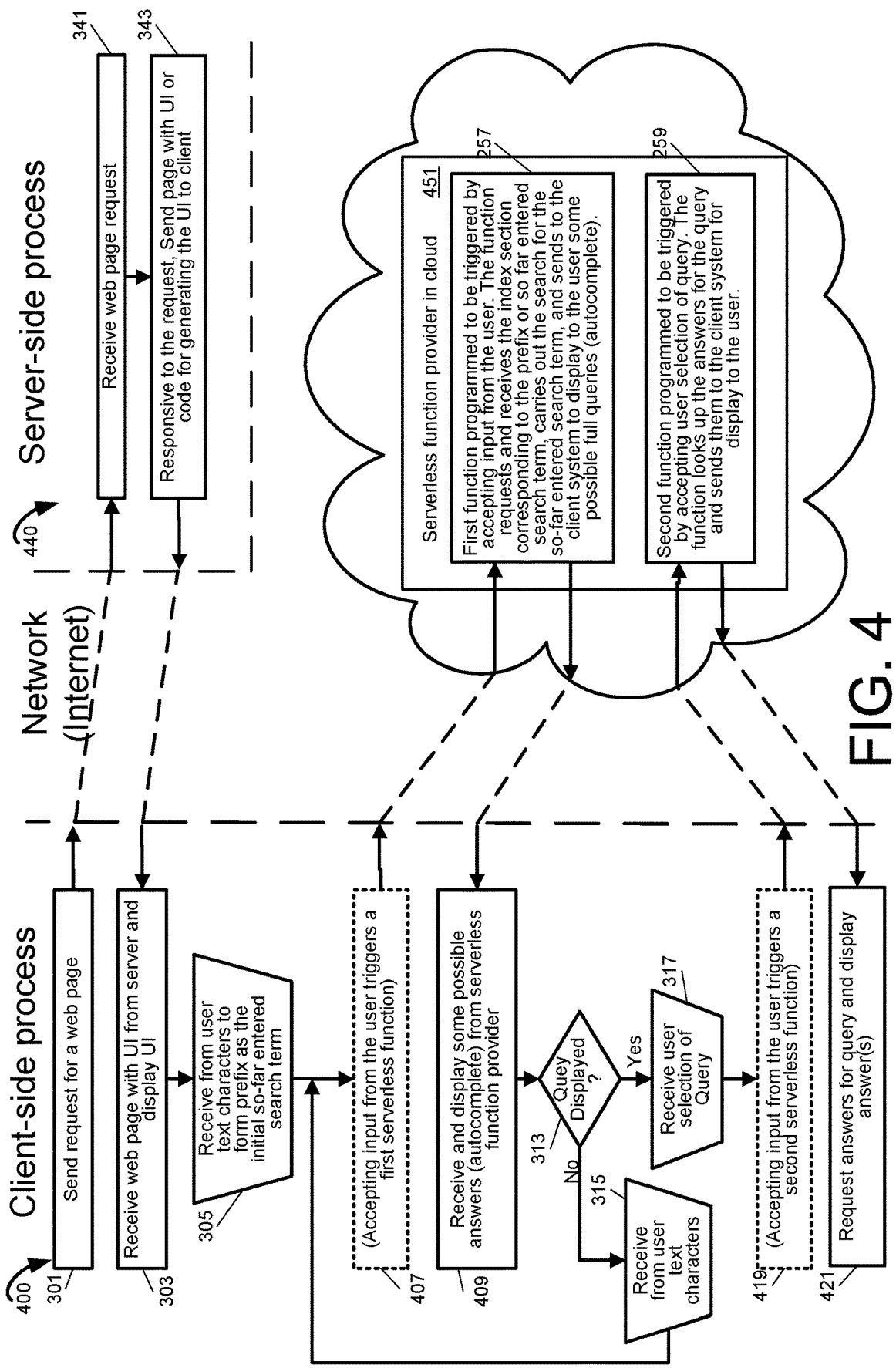
FIG. 4 shows a simplified flowchart of a client-side process communicating with cloud storage and a cloud serverless function provider, according to a different embodiment of the invention.

FIG. 4 shows a simplified flowchart of a client-side process 400 and server-side process 440 performed on a server processing system (not shown in FIG. 2, but may be similar to server processing system 131) linked by the network 221 (the Internet), according to an FaaS embodiment of the invention.

It is assumed that as part of the server-side process 440 (or some separate process), a preprocessing process has been carried out, e.g., on some server processing system 131 (or some separate processing system). The pre-processing process includes steps 331 and 435 that are essentially the same as shown as steps 331 and 335 in FIG. 3, except that in step 435, the index database sections are stores as section 265 in cloud storage 263. Note the storing in step 335 of FIG. 3 may also be in cloud storage). See above for the description of the preprocessing steps.

One client processing system, say client 141 acts as the developer processing system on which the developer develops the code for Function 1 and Function 2 uploads the code 257, 259 into storage 253 of the provider processing system 251. It is assumed that the serverless code has been uploaded to the storage 253 of serverless function provider 251.

For purposes of example, it is assumed that the client-side process 400 (part of code segments 213) starts with step 301 of requesting a web page on which to carry out a search from a server processing system (e.g., system 131), which in step 341 accepts the request and in step 343 sends the requested page to the client-side process 400. In one embodiment, step 343 includes integrating a search UI acting as the input UI which is configured with information to enable it to be coupled via the Internet 221 to the serverless function provider's system 251 so that its functionality can trigger one or the other of serverless functions 257 and 259. The client-side process in 303 receives the web page (with the search UI) and displays the web page with the search UI.

In 305, the user enters and process 400 accepts, one by one, characters of a query in a search box of the search UI.

Steps 301, 341, 343, 303, and 305 may be the same as those in FIGS. 3A and 3B, and described above, except that step 305 causes triggering (shown as 407) of the first serverless function 257 (Function 1) that was uploaded to storage 253. Function 1 257 that is triggered (407) by user-entered character(s) being accepted in step 305 to form an initial prefix (and later, as each new character is accepted in step 315), is configured to, after detecting the trigger, request and receive from the index database sections 265 the index database section corresponding to the initial prefix or so far entered search term, to carry out a search for possible search terms for the so-far entered search term, and to sends to the user some possible search terms to display as part of autocomplete functionality.

Every time there is a trigger (initially after an initial prefix sufficient to identify the database sections is received by the user, then each time an additional character is received from the user), the first serverless function 257 detects its triggering event and carries out its operations including sending possible complete search terms with the so-far entered prefix to the client side process 400. In 409, these possible complete search terms are displayed for the user on the display 107.

The user decides (313) whether the desired search term is one of the ones displayed. If not, the user enters the next character which is accepted in 315 which causes in 407 the automatic triggering of the first serverless function 257 which causes in 409 possible complete search queries to be displayed.

Eventually, either the complete query is entered, or the user recognizes the complete search term. The user's selection of such complete search term is accepted (317). In one version, the acceptance of the selection of the complete search term triggers (shown as 419) the second serverless function 259 that is configured, after detecting the its triggering event, to look up the selected search term in the appropriate index database section to obtain the answer(s) and any context(s), e.g., the answer may be a web page, and to serves the answers and any contexts to the client-side process.

In 421, the client-side process receives and displays the answers, e.g., the web pages and any contexts to the user. From these answers the user may select a particular web page or website and request to view that web-page or website.

Note that in some serverless embodiments, the search UI is configured, as an input UI, to include information for coupling to the provider processing system 251 that carries out the serverless functions, so that, in the case of the first serverless function, a first event consisting of the UI accepting a character from the input causes the triggering of the first serverless function 257, and in the case of the second serverless function, a second event consisting of the UI accepting the selection by the user of the complete search term causes the triggering of the first serverless function 259.

Note that in alternate versions, the first serverless function incorporates the second serverless function, so is programmed also to automatically be triggered (in 419) by step 317 of accepting the user selection of the full query, in which case when triggered upon reaching a leaf node in the index database section or the user's selecting of the complete query, to obtain the answer(s) and any context(s) from the index database section, and to send these answer(s) and any context(s) to the client-side process to display these to the user. Without loss of generality, the embodiment described herein describes two serverless functions 257 and 259.

Note that while FIG. 4 includes the autocomplete functionality, in alternate embodiments of the invention, no autocomplete is included, and the client-side process searches the received index database section in one go for the complete search term. The advantages of having relatively small index database sections are still obtained in such alternate embodiments.

Thus, one feature of the serverless function embodiments of the invention is that rather than using a complete index database, only an index database section is searched. Each database index section can be significantly smaller than the complete index, making it possible, for example, to include the complete index database section itself in the serverless function. The serverless function thus may be small.

In one embodiment, each index database section is limited to be no more than 10 MB. In particular embodiments, each index database section is limited to be no more than 1 MB.

Thus, the use of relatively small index database provides increased functionality to the processing system, compute the client processing system, enabling faster searches, and enabling complete searches to be carried out in a small serverless function.

The Code of the Serverless Functions

Some embodiments of the invention include a non-transitory storage medium, e.g., a storage medium coupled to or part of the developer processing system 141. The non-transitory storage medium contains the code of the first serverless function.

Figure 5A:
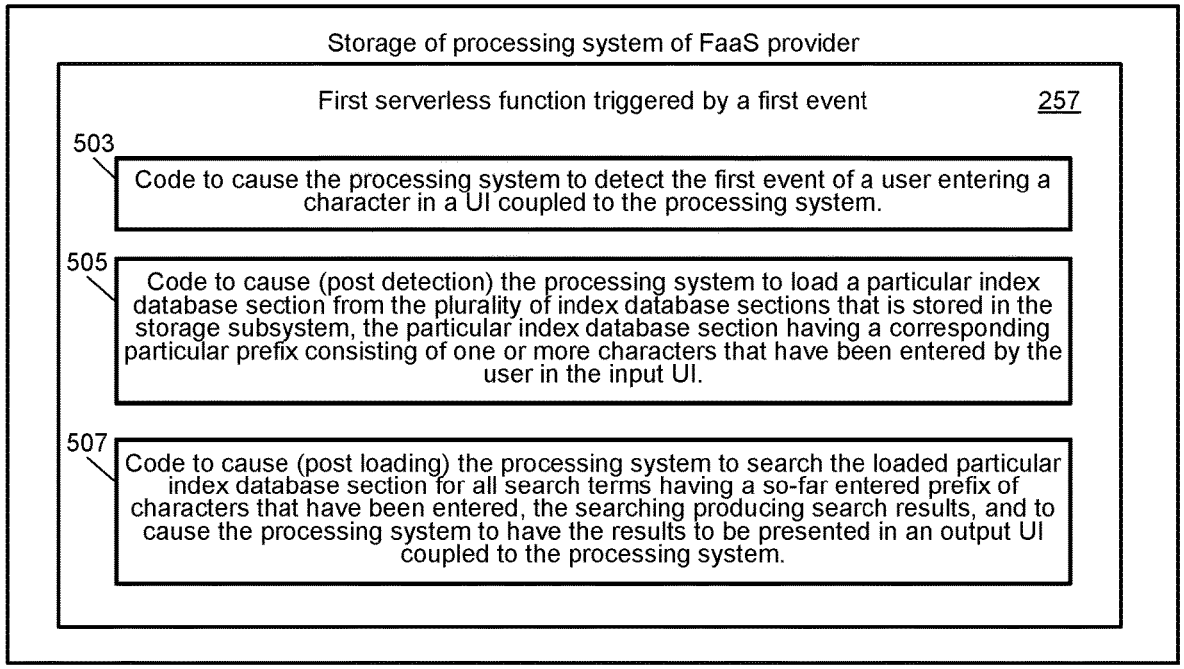
FIG. 5A shows a simplified block diagram of part of a storage medium that contains the code segments of a first serverless function according to an embodiment of the invention.

FIG. 5A shows a simplified block diagram the first serverless function 257 and code included therein after being loaded into the storage 253 of the provider processing system 251 of the serverless function provider (the FaaS provider). The first serverless function 257 is triggered by a first event of a user entering a character in the input UI coupled to the provider processing system 251.

The code defining the first function includes code 503 to cause the provider processing system 251 to detect the first event and code 505 to cause the provider processing system 251 to load a particular index database section from a plurality 265 of index database sections that is stored, e.g., in cloud storage 263. The particular index database section has a corresponding particular prefix consisting of one or more characters that have been entered by the user in the input UI. The code of the first function further includes code to cause the provider processing system 251 to search the loaded particular index database section for all search terms having a so-far entered prefix of characters that have been entered, such searching producing search results, and to cause the provider processing system 251 to have the results to be presented in an output UI coupled to the provider processing system 251.

In some versions, the code defining the first function further includes code to cause the provider processing system 251 to ascertain whether the entered character appended with earlier entered character or characters, if any, forms the corresponding particular prefix, and responsive to ascertaining that that the entered character appended with earlier entered character or characters, if any, does not form the corresponding particular prefix, cause returning to executing the code to cause the provider processing system 251 to detect the first event.

In some versions, the code to load the particular index database section is configured to load the particular index database section responsive to ascertaining that the particular index database section has not been loaded.

Figure 5B:
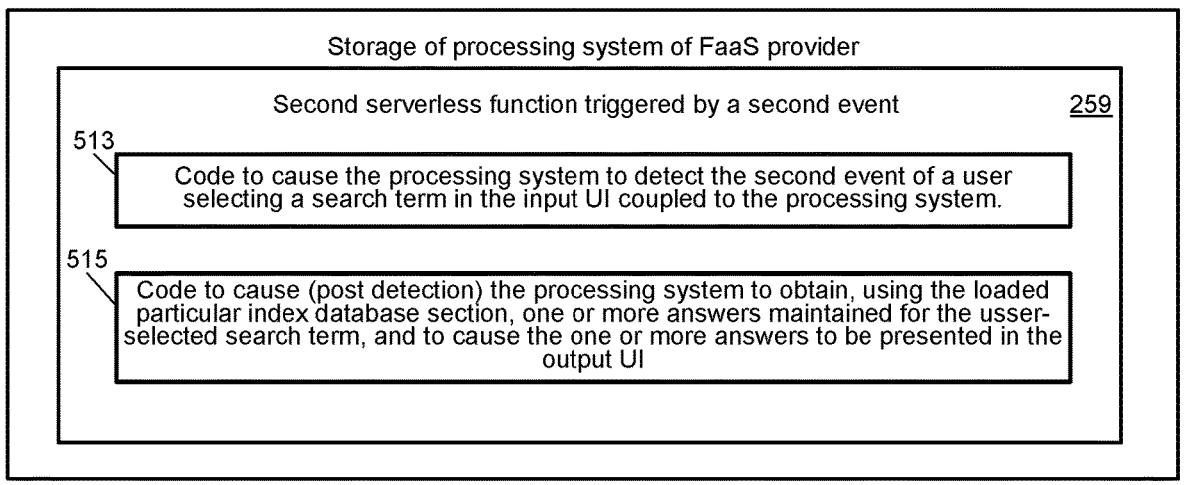
FIG. 5B shows a simplified block diagram of part of a storage medium that contains the code segments of a second serverless function according to an embodiment of the invention.

In some versions, each of one or more of the search terms in the plurality of index database sections has one or more answers or links thereto. In some such versions, also loaded into the storage subsystem 253 is code defining a second computer-executable function 259 that is triggered by a second event being a user selecting a search term the input UI. FIG. 5B shows a simplified block diagram of part of the storage subsystem 253 contains the code segments of the second serverless function 259 according to an embodiment of the invention. The code defining the second function includes code 513 to cause the provider processing system 251 to detect the second event, and code 515 to cause the provider processing system 251 to obtain, using the loaded particular index database section, one or more answers maintained for the selected search term, and to cause the one or more answers to be presented in the output UI.

Some embodiments of the invention do not include the autocomplete functionality. Some such embodiment includes a non-transitory medium configured with computer readable code defining a computer-executable function that is triggered by an event of the user selecting a search term in an input user interface (UI) coupled to the provider processing system 251. After being loaded in the storage 253 of the provider processing system 251, the code defining the function includes code to cause the provider processing system 251 to detect the event, code to cause the provider processing system 251 to load a particular index database section from a plurality of index database sections that is stored in a storage subsystem, e.g., cloud storage 263, each index database section containing all search terms having a corresponding prefix. The particular index database section is the one that has a corresponding particular prefix that is the prefix to the user selected search term. The code defining the function further includes code to cause the provider processing system 251 to search the loaded particular index database section for the user-selected search term, to obtain, using the loaded particular index database section, one or more answers maintained for the user-selected search term, and to cause the one or more answers to be presented in an output UI coupled to the provider processing system.

Two Example Index Prefix Databases

Embodiments of the invention use index database sections which are each a prefix database of search terms each prefix database defined by a corresponding prefix of one or more characters, with at least one corresponding prefix having at least three characters.

A trie has as a root node with up to 26 edges (assuming case-independent search terms which start with a English letter) or more than 26 edges in the case search terms may start with a digit and/or a special character. See FIG. 6A. The index database sections used in embodiments of the invention each have a root node defined by the corresponding index of the section.

A first set of embodiments use index database sections that are each a trie with a root node defined by the corresponding index of the section, such prefixes having one or more characters (at least one having three characters). A second set of embodiments use index database sections that are each a radix trie (also called radix tree) with a root node defined by the corresponding index of the section, such prefixes having one or more characters (at least one having three characters).

Figure 7A:
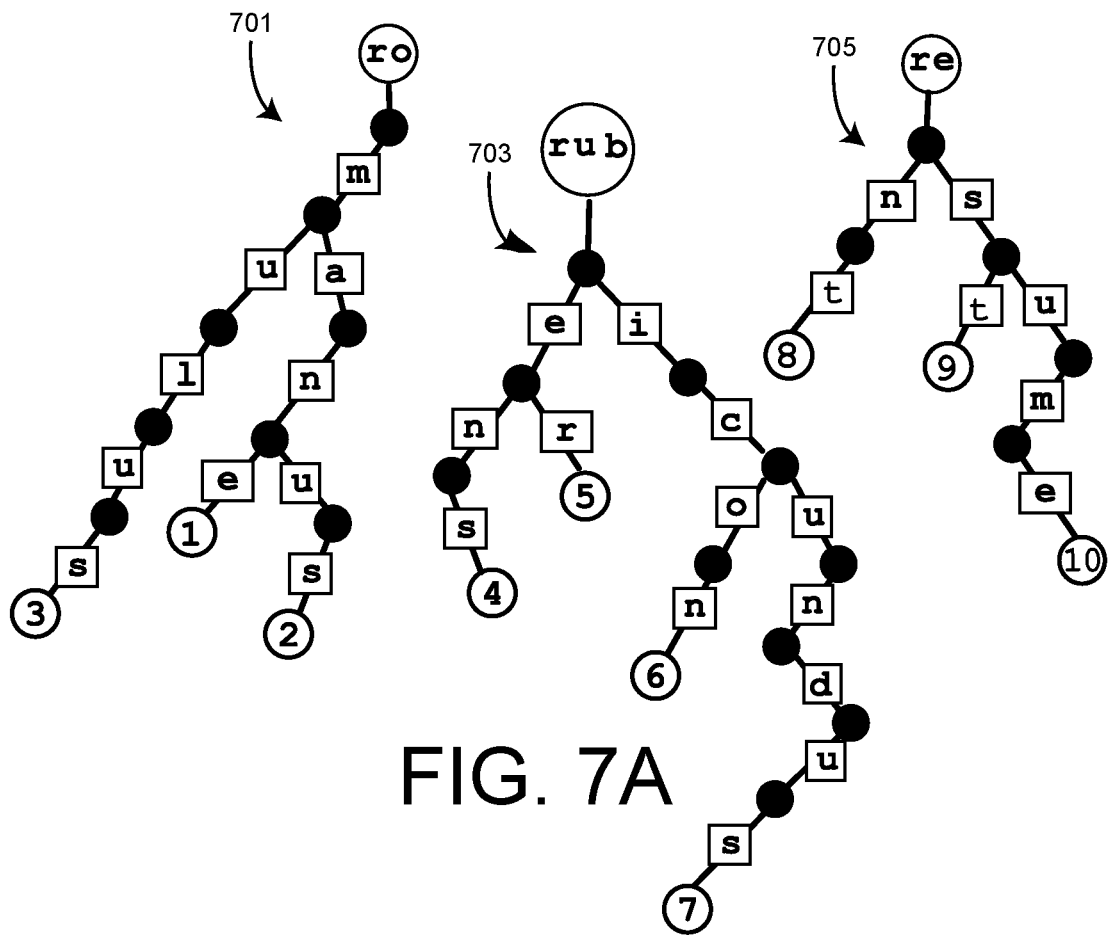
FIGS. 7A and 7B illustrate simple examples of trie index database sections and radix trie index database sections of the vocabulary of FIG. 6A according to aspects of the present invention.
Figure 7B:
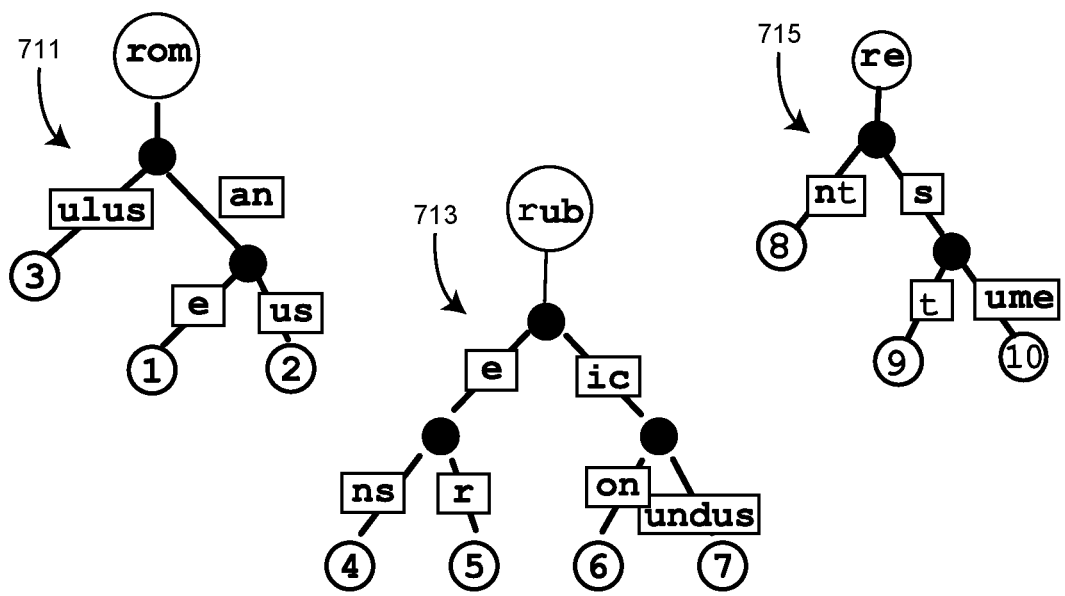

One set of embodiments uses trie index database sections and radix trie index database sections, each section having a root node of a prefix with two characters, except for one with three characters. FIGS. 7A and 7B illustrate simple examples of trie index database sections 701, 703, and 705 and radix trie index database sections 711, 713, and 715 of the vocabulary 631 of FIG. 6A according to aspects of the present invention. As can be seen, the trie sections of FIG. 7A are each significantly smaller than the trie of FIG. 6A, even for such a small vocabulary 631. Similarly, the radix trie sections of FIG. 7B are each significantly smaller than the radix trie of FIG. 6B.

Figure 8A:
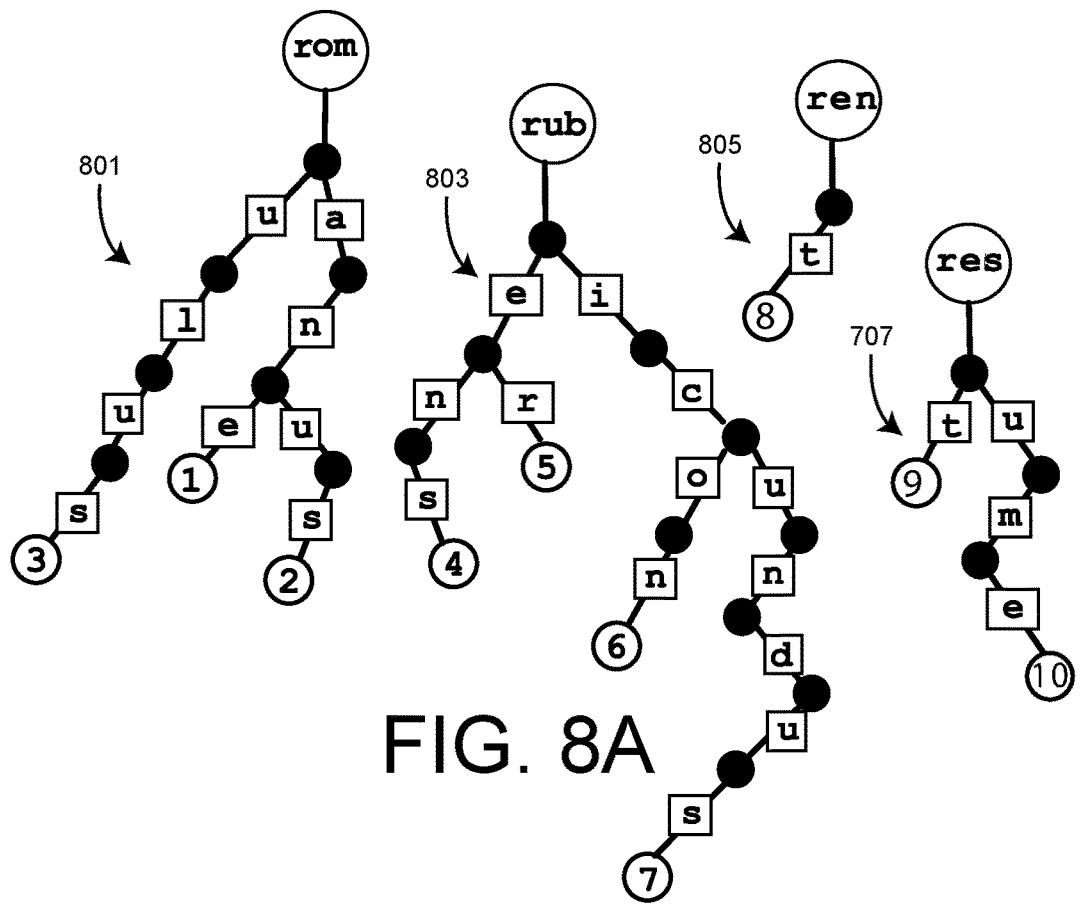
FIGS. 8A and 8B illustrate simple examples of alternate trie index database sections and alternate radix trie index database sections of the vocabulary of FIG. 6A according to aspects of the present invention.
Figure 8B:
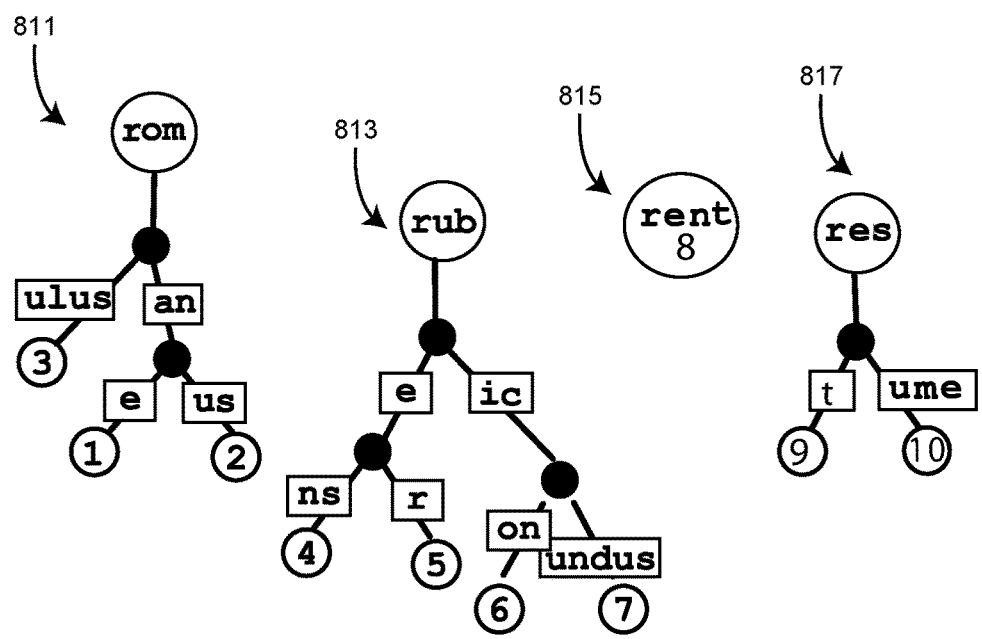

Another set of embodiments uses trie index database sections and radix trie index database sections, each section having a root node of a prefix with three or more characters. FIGS. 8A and 8B illustrate simple examples of trie index database sections 801, 803, 805, and 807 and radix trie index database sections 811, 813, 815, and 817 of the vocabulary 631 of FIG. 6A according to aspects of the present invention in which all prefix nodes have at least three characters. As can be seen, some trie sections of FIG. 8A are smaller than the trie sections of FIG. 7A. Similarly, come radix trie sections of FIG. 8B are smaller than the radix trie sections of FIG. 7B, with one radix trie section 815 being a complete search term.

Index Database Section for Popular Searches

Some search terms may be often searched. In addition to having search database sections labeled by corresponding prefixes, some embodiments of the invention include one or more additional index database sections for popular searches.

Suppose for example, there is includes a single index database section for popular search terms. The single database section may have a prefix database structure, such as a trie, a radix trie (or another prefix database structure such as a ternary search tree). In such embodiments, searches are carried out sequentially. Initially, a search looks up the index database section for popular search terms, to see if the search if for one of the popular search terms, and if not for one the popular queries, then the appropriate index database section defined by the prefix of the term is looked up.

In some such versions, e.g., for serverless function implementations, the first lookup may be carried out in parallel for both popular search terms in the additional index database section for popular searches, and in the appropriate index database section defined by the prefix of the term.

Some versions of the invention include collecting search statistics, and as part of index database maintenance process, remove from the prefix-defined index database sections one or more "popular" search terms, e.g., terms that are above a popularity threshold, e.g., a settable threshold, or a predefined threshold. The index database maintenance process includes adding the one or more removed search terms into the index database section for popular searches.

So maintaining and searching of a single index database section for popular searches can be extended to maintaining for than one index database section for popular searches, and how to modify the code and the methods for having a plurality of such popular-search index database sections would be straightforward for one skilled in the art.

Additional Implementations

As mentioned above, a single search term may have several answers. Consider for example an electronic online catalog wherein each product has one or more keywords, and the keywords form possible search terms. One embodiment of such a catalog would have the index database sections store information (as fields) on all products that have a particular keyword. With such an arrangement, it is possible that some index database sections may become relatively large. One alternate implementation of the invention (applicable to both the client-server and the serverless function embodiments is to store, as a field in at least some database sections, a pointer to an external database entity that includes for the particular keyword that keyword's products and information thereon.

General

Note that the term "a character input mechanism" of a client device or processing system means any of a keyboard or keypad that is integral to the client device, and a keyboard or keypad that is coupled, by wire or wirelessly, directly, or via some network, to the client device, or a "virtual" keyboard or keypad in the form of a display of a keyboard or keypad with which a user can interact. Furthermore, by a display being included in a client device is meant any of a display that is integral to the client device, and a display that is coupled, by wire or wirelessly, directly, or via some network, to the client device.

Unless specifically stated otherwise, as apparent from the following description, it is appreciated that throughout the specification discussions utilizing terms such as "processing," "computing," "calculating," "determining" or the like, may refer to, without limitation, the action and/or processes of hardware, e.g., an electronic circuit, a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The network coupling the server processing system 131 to the client processing system 101 may be an internetwork such as the Internet, a cellular communication network, a combination of the two, or even an intranet.

Note that when a method is described that includes several elements, e.g., several steps, no ordering of such elements, e.g., of such steps is implied, unless specifically stated.

The methodologies described herein are, in some embodiments, performable by one or more processors of a server processing system 131, or, as indicated above, one or more client processors of a client processing system 101. The processor(s), in either case, accept logic, instructions encoded on one or more computer-readable media. When executed by one or more of the processors, the instructions cause carrying out at least one of the methods described herein. Any processor capable of executing a set of instructions (sequential or otherwise) that specify actions to be taken is included. Thus, one example is a typical processing system that includes one or more processors. Each processor may include one or more of a CPU or similar element, a graphics processing unit (GPU), field-programmable gate array, application-specific integrated circuit, and/or a programmable DSP unit. The processing system further includes a storage subsystem with at least one storage medium, which may include memory embedded in a semiconductor device, or a separate memory subsystem including main RAM and/or a static RAM, and/or ROM, and also cache memory. The storage subsystem may further include one or more other storage devices, such as magnetic and/or optical and/or further solid state storage devices. A bus subsystem may be included for communicating between the components. The processing system further may be a distributed processing system with processors coupled by a network, e.g., via network interface devices or wireless network interface devices. If the processing system requires a display, such a display may be included, e.g., a liquid crystal display (LCD), organic light emitting display (OLED), or a cathode ray tube (CRT) display. If manual data entry is required, the processing system also includes an input device such as one or more of an alphanumeric input unit such as a keyboard, a pointing control device such as a mouse, and so forth. The term storage device, storage subsystem, or memory unit as used herein, if clear from the context and unless explicitly stated otherwise, also encompasses a storage system such as a disk drive unit. The processing system in some configurations may include a sound output device, and a network interface device.

In one example, a server computer system carries out the pre-processing. Such a computer may be a standard computer system used for serving information to clients, e.g., clients connected via a network. The client device, in one embodiment, is a mobile device, such as a smart phone (e.g., iPhone, Android phone, or some other type of smart-phone), a tablet (e.g., iPad, Android tablet, Microsoft Surface, etc.), a mobile music player that has a screen and a real or virtual, i.e., displayed keyboard, and so forth. Such devices have small screens, so that being able to avoid needing to display a traditional results web page provides some advantage.

In some embodiments, a non-transitory computer-readable medium is configured with, e.g., encoded with instructions, e.g., logic that when executed by one or more processors, e.g., the processor of a mobile device and the one or more processors of a server device. A processor may be a digital signal processing (DSP) device or subsystem that includes at least one processor element and a storage subsystem containing instructions that when executed, cause carrying out a method as described herein. Some embodiments are in the form of the logic itself. A non-transitory computer-readable medium is any computer-readable medium that is statutory subject matter under the patent laws applicable to this disclosure, including Section 101 of Title 35 of the United States Code. A non-transitory computer-readable medium is for example any computer-readable medium that is not specifically a transitory propagated signal or a transitory carrier wave or some other transitory transmission medium. The term "non-transitory computer-readable medium" thus covers any tangible computer-readable storage medium. In a typical processing system as described above, the storage subsystem thus includes a computer-readable storage medium that is configured with, e.g., encoded with instructions, e.g., logic, e.g., software that when executed by one or more processors, causes carrying out one or more of the method steps described herein. The software may reside in the hard disk, or may also reside, completely or at least partially, within the memory, e.g., RAM and/or within the processor registers during execution thereof by the computer system. Thus, the memory and the processor registers also constitute a non-transitory computer-readable medium on which can be encoded instructions to cause, when executed, carrying out method steps.

Non-transitory computer-readable media include any tangible computer-readable storage media and may take many forms including non-volatile storage media and volatile storage media. Non-volatile storage media include, for example, static RAM, optical disks, magnetic disks, and magneto-optical disks. Volatile storage media includes dynamic memory, such as main memory in a processing system, and hardware registers in a processing system.

While the computer-readable medium is shown in an example embodiment to be a single medium, the term "medium" should be taken to include a single medium or multiple media (e.g., several memories, a centralized or distributed database, and/or associated caches and servers) that store the one or more sets of instructions.

Furthermore, a non-transitory computer-readable medium, e.g., a computer-readable storage medium may form a computer program product, or be included in a computer program product.

In alternative embodiments, the one or more processors operate as a standalone device or may be connected, e.g., networked to other processor(s), in a networked deployment, or the one or more processors may operate in the capacity of a server or a client machine in server-client network environment, or as a peer machine in a peer-to-peer or distributed network environment. The term processing system encompasses all such possibilities, unless explicitly excluded herein. The one or more processors may form a personal computer (PC), a media playback device, a headset device, a hands-free communication device, a tablet PC, a set-top box (STB), a Personal Digital Assistant (PDA), a game machine, a cellular telephone, a Web appliance, a network router, switch or bridge, or any machine capable of executing a set of instructions (sequential or otherwise) that specify actions to be taken by that machine.

Note that while some diagram(s) only show(s) a single processor and a single storage subsystem, e.g., a single memory that stores the logic including instructions, those skilled in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, as will be appreciated by those skilled in the art, embodiments of the present invention may be embodied as a method, an apparatus such as a special purpose apparatus, an apparatus such as a method, logic, e.g., embodied in a non-transitory computer-readable medium, or a computer-readable medium that is encoded with instructions, e.g., a computer-readable storage medium configured as a computer program product. The computer-readable medium is configured with a set of instructions that when executed by one or more processors cause carrying out method steps. Accordingly, aspects of the present invention may take the form of a method, an entirely hardware embodiment, an entirely software embodiment or an embodiment combining software and hardware aspects. Furthermore, the present invention may take the form of program logic, e.g., a computer program on a computer-readable storage medium, or the computer-readable storage medium configured with computer-readable program code, e.g., a computer program product.

It will also be understood that embodiments of the present invention are not limited to any particular implementation or programming technique and that the invention may be implemented using any appropriate techniques for implementing the functionality described herein. Furthermore, embodiments are not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the DESCRIPTION OF EXAMPLE EMBODIMENTS are hereby expressly incorporated into this DESCRIPTION OF EXAMPLE EMBODIMENTS, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All U.S. patents, U.S. patent applications, and International (PCT) patent applications designating the United States cited herein are hereby incorporated by reference, except in those jurisdictions that do not permit incorporation by reference, in which case the Applicant reserves the right to insert any portion of or all such material into the specification by amendment without such insertion considered new matter. In the case the Patent Rules or Statutes do not permit incorporation by reference of material that itself incorporates information by reference, the incorporation by reference of the material herein excludes any information incorporated by reference in such incorporated by reference material, unless such information is explicitly incorporated herein by reference.

Any discussion of other art in this specification should in no way be considered an admission that such art is widely known, is publicly known, or forms part of the general knowledge in the field at the time of invention.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting of only elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other, but may be. Thus, the scope of the expression "a device A coupled to a device B" should not be limited to devices or systems wherein an input or output of device A is directly connected to an output or input of device B. It means that there exists a path between device A and device B which may be a path including other devices or means in between. Furthermore, coupled to does not imply direction. Hence, the expression "a device A is coupled to a device B" may be synonymous with the expression "a device B is coupled to a device A." "Coupled" may mean that two or more elements are either in direct physical or electrical contact, or that two or more elements are not in direct contact with each other but yet still co-operate or interact with each other.

In addition, use of the "a" or "an" are used to describe elements and components of the embodiments herein. This is done merely for convenience and to give a general sense of the invention. This description should be read to include one or at least one and the singular also includes the plural unless it is obvious that it is meant otherwise.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention, to the extent permitted by law. For example, to the extent permitted by law: any formulas given above are merely representative of procedures that may be used; functionality may be added or deleted from the block diagrams and operations may be interchanged among functional blocks; and steps may be added to or deleted from methods described within the scope of the present invention.

We claim:
1. A data processing system comprising:
one or more processors; and
one or more storage subsystems,
at least one of the storage subsystems comprising:
(a) code that when executed causes at least one of the processors to accept a first search term entered by a first user via a user interface, the first search term consisting of one or more words including a first character,
the first search term having a prefix after at least said first character of the first search term is accepted;
(b) code that when executed causes at least one of the processors to determine a first index section to load for searching after at least the first two characters of the first search term are accepted,
the determining according to the prefix of the first search term,
the first index section being one of a plurality of index sections, each index section containing all terms having a corresponding prefix of at least two characters, at least one index section containing all terms having a corresponding prefix of at least three characters,
each index section arranged as a prefix database of terms that starts with each of the term's corresponding prefix,
the set of corresponding prefixes of the plurality of index sections comprising all possible prefixes that may be searched;
(c) code that when executed causes at least one of the processors to load the determined first index section;
(d) code that when executed causes at least one of the processors to carry out a search for the first search term using the loaded first index section to produce first search results; and
(e) code that when executed causes at least one of the processors to cause presenting to the first user the first search results of the search for the first search term,
wherein
the code for loading and searching forms a serverless function that is loaded to a serverless function provider, and is automatically executed upon the first user entering characters, such that execution of the serverless function causes the loading and searching for the first search term using the first loaded index section;
wherein at least one of the storage subsystems comprises:
(f) code that when executed causes at least one of the processors to accept a second search term entered via the first or a second user,
the second search term consisting of one or more words including a first character of the second search term,
the second search term having a prefix after at least said first character of the second search term is accepted;
(g) code that when executed causes at least one of the processors to determine a second index section of the plurality of index sections to use for searching after at least the first two characters of the second search term are accepted, the determining of the second index section according to the prefix of the second search term;
(h) code that when executed causes at lease one of the processors to ascertain whether the determined second index section is included in or is the first index section,
wherein the serverless function is automatically executed upon the first or second user entering characters,
wherein in the case said ascertaining ascertains that the determined second index section is not included in or is not the first index section executing the serverless function includes loading of the determined second index section and carrying out a search for the second search term using the loaded second index section to produce second search results, and wherein in the case said ascertaining ascertains that the determined second index section is or is included in the first index section, executing the serverless function causes carrying out a search for the second search term using the loaded first index section or a subsection thereof to produce second search results without loading the second index section; and (j) code that when executed causes at least one of the processors to cause presenting to the first or second user the second search results of the search for the second search term.

2. The data processing system of claim 1, wherein the accepting of the first search term occurs one character at a time so that there is a so-far entered prefix prior to the first search term being entered by the first user, wherein the loading of the serverless function occurs after the first has been entered, wherein the serverless function when executed causes carrying out a search, using the loaded first index section, for the all search terms that have the so-far entered first prefix; and wherein at least one of the storage subsystem comprises code that when executed causes at least one of the processors to cause presenting to the first user at least some of the search terms that have the so-far entered first prefix, such that the first user can select one of the presented search terms as the first search term.

3. The data processing system of claim 1, wherein the storage subsystem further comprises:

(a) code that when executed causes at least one of the processors to ascertain whether the determined first index section is larger than a predefined size, (b) code that when executed causes at least one of the processors, in response to the ascertaining that the first index section is larger than the predefined size, (i) to partition the determined first index section into first index subsections, each first index subsection containing all terms from the determined first index section that have a corresponding prefix of more characters than the corresponding prefix of the determined first index section; and (ii) to determine a first index subsection to load for searching, the determining according to the prefix of the first search term, wherein the serverless function when executed causes loading the determined first index subsection, and searching for the first search term using the loaded first index subsection.

4. The data processing system of claim 3, wherein the storage subsystem further comprises:

code that when executed in response to the ascertaining that the first index section is larger than the predefined size causes at least one of the processors to store the first index subsections as additional first index sections.

5. The data processing system of claim 1, wherein at least one prefix database of terms has the structure of a trie.

6. The data processing system of claim 5, wherein at least one trie has the structure of a radix trie.

7. A non-transitory machine-readable medium containing instructions that when executed by one or more processors of a processing system carry out a method comprising:

(a) accepting a first search term consisting of characters entered by a first user into a first user interface, the first search term consisting of one or more words including a first character of the first search term, the accepted first search term having a prefix after at least the first character of the first search term is accepted;

(b) determining a first index section, the determining according to the prefix of the first search term after at least the first two characters of the first search term have been entered, the first index section being one of a plurality of index sections, each index section of the plurality containing all terms having a prefix of at least two characters, at least one index section of the plurality containing all terms having a prefix having at least three characters, each index section of the plurality arranged as a prefix database of terms, the prefixes of the plurality of index sections comprising all possible prefixes that may be searched;

(c) loading a serverless function to a serverless function provider, wherein the serverless function is automatically executed upon the first user entering characters, and when executed, causes (i) loading the determined first index section; and
  (ii) carrying out a search for the first search term using the loaded first index section to produce first search results; and (d) presenting to the first user the results of the search for the first search term;

(e) accepting a second search term entered by the first or a second user, the second search term consisting of one or more words including a first character of the second search term;

(f) determining a second index section of the plurality of index sections after at least the first two characters of the second search term are accepted, the determining according to the prefix of the second search term;

(g) ascertaining whether the determined second index section is included in or is the first index section, wherein the serverless function is automatically executed upon the first or second user entering characters of the second search term, wherein in the case said ascertaining ascertains that the determined second index section is not included in or is not the first index section executing the serverless function includes loading of the determined second index section and carrying out a search for the second search term using the loaded second index section to produce second search results, and wherein in the case said ascertaining ascertains that the determined second index section is or is included in the first index section, executing the serverless function causes carrying out a search for the second search term using the loaded first index section or a subsection thereof to produce second search results without loading the second index section; and (h) presenting to the first or second user the second search results of the search for the second search term.

8. The non-transitory machine-readable medium of claim 7, wherein the accepting of the first search term accepts one character at a time so that there is a so-far entered prefix prior to the first search term being accepted, wherein the loading of the first search term by the serverless function is after the first prefix has been accepted, wherein prior to the first search term being accepted and after the serverless function loads the first index section, the serverless function is configured to search for all search terms that have the so-far entered first prefix using the loaded first index section, and, wherein the method further comprises presenting to the first user at least some of the results of the search for all search terms that have the so-far entered first prefix, such that the first user can select one of the presented search terms as the first search term.

9. The non-transitory medium of claim 7, wherein the method further comprises:

ascertaining whether the determined first index section is larger than a predefined size, in response to the ascertaining that the first index section is larger than the predefined size:

partitioning the determined first index section into first index subsections, each first index subsection containing all terms from the determined first index section that have a corresponding prefix of more characters than the corresponding prefix of the determined first index section; and determining a first index subsection to load for searching, the determining according to the prefix of the first search term, wherein the serverless function includes:

loading the determined first index subsection; and searching for the first search term using the loaded first index subsection; and in response to the ascertaining that the first index section is not larger than the predefined size, not carrying out said partitioning.

10. The non-transitory medium of claim 7, wherein at least one of the prefix databases of terms has the structure of a trie.

11. The non-transitory medium of claim 10, wherein at least one trie has the structure of a radix trie.

12. A machine-implemented method comprising:

(a) accepting a first search term of characters from a first user interface into which a first user enters a first search term, the first search term having a prefix after at least the first character of the search term has been entered;

(b) determining a first index section to load, the determining according to the prefix of the first search term, the first index section being one of a plurality of index sections, each index section of the plurality containing all terms having a prefix of two or more characters, at least one index section of the plurality containing all terms having a prefix having at least three characters, each index section of the plurality arranged as a prefix database of terms, the prefixes of the plurality of index sections comprising all possible prefixes that may be searched;

(c) loading a serverless function to a serverless function provider, wherein the serverless function is automatically executed upon the first user entering characters, and when executed, causes (i) loading the determined first index section; and (ii) carrying out a search for the first search term using the loaded first index section to produce first search results; and (d) presenting to the first user the results of the search for the first search term;

(e) accepting a second search term entered by the first or a second user, the second search term consisting of one or more words including a first character of the second search term;

(f) determining a second index section of the plurality of index sections after at least the first two characters of the second search term are accepted, the determining according to the prefix of the second search term;

(g) ascertaining whether the determined second index section is included in or is the first index section, wherein the serverless function is automatically executed upon the first or second user entering characters of the second search term, wherein in the case said ascertaining ascertains that the determined second index section is not included in or is not the first index section executing the serverless function includes loading of the determined second index section and carrying out a search for the second search term using the loaded second index section to produce second search results, and wherein in the case said ascertaining ascertains that the determined second index section is or is included in the first index section, executing the serverless function causes carrying out a search for the second search term using the loaded first index section or a subsection thereof to produce second search results without loading the second index section; and (h) presenting to the first or second user the second search results of the search for the second search term.

13. The method of claim 12 further comprising:

ascertaining whether the determined first index section is larger than a predefined size;

in response to the ascertaining that the first index section is larger than the predefined size:

partitioning the determined first index section into first index subsections, each first index subsection containing all terms from the determined first index section that have a corresponding prefix of more characters than the corresponding prefix of the determined first index section; and determining a first index subsection to load for searching, the determining according to the prefix of the first search term, wherein the serverless function includes:

loading the determined first index subsection, and searching for the first search term using the loaded first index subsection;

in response to the ascertaining that the first index section is not larger than the predefined size, not carrying out said partitioning.

14. The method of claim 13 further comprising:

in response to the ascertaining that the first index section is larger than the predefined size, storing the first index subsections as additional index sections.

15. The method of claim 12, wherein the accepting accepts one character at a time so that there is a so-far entered first prefix prior to the first search term being accepted, wherein the loading by the serverless function is after the first prefix has been accepted, wherein prior to the first search term being accepted and after the loading by the serverless function of the first index section, the serverless function is configured to search, for the first search term using the loaded first index section, for the all search terms that have the so-far entered first prefix, and wherein the method presents to the first user at least some of the results of the search for all search terms that have the so-far entered first prefix.

16. The method of claim 12, wherein at least one of the prefix databases of terms has the structure of a trie.

17. The method of claim 16, wherein at least one of the tries has the structure of a radix trie.

18. A non-transitory machine-readable medium configured with computer readable code comprising:
   (a) code that when executed by a first processing system comprising at least one processor and storage, causes at least one of the processors to accept a first search term entered by a first user, the first search term consisting of one or more words including a first character of the first search term, the first search term having a prefix after at least said first character of the first search term is accepted;
   (b) code that when executed causes at least one of the processors to determine a first index section to load for searching after at least the first two characters of the first search term are accepted, the determining according to the prefix of the first search term, the first index section being one of a plurality of index sections, each index section containing all terms having a corresponding prefix of at least two characters, each index section arranged as a prefix database of terms that start with each of the term's corresponding prefix, the set of corresponding prefixes of the plurality of index sections comprising all possible prefixes that may be searched;
   (c) code that when executed causes loading a serverless function to a serverless function provider,
      wherein the serverless function is automatically executed upon the first user entering characters, and when executed causes
         (i) loading the determined first index section, and
         (ii) carrying out a search for the first search term using the loaded first index section to produce first search results; and
   (d) code that when executed causes presenting to the first user the first search results of the search for the first search term,
   e) code that when executed causes accepting a second search term entered by the first or a second user, the second search term consisting of one or more words including a first character of the second search term;
   (f) code that when executed causes determining a second index section of the plurality of index sections after at least the first two characters of the second search term are accepted, the determining according to the prefix of the second search term;
   (g) code that that when executed causes ascertaining whether the determined second index section is included in or is the first index section;
      wherein the serverless function is automatically executed upon the first or second user entering characters of the second search term,
      wherein in the case said ascertaining ascertains that the determined second index section is not included in or is not the first index section, executing the serverless function includes loading of the determined second index section and carrying out a search for the second search term using the loaded second index section to produce second search results, and
      wherein in the case said ascertaining ascertains that the determined second index section is or is included in the first index section, executing the serverless function causes carrying out a search for the second search term using the loaded first index section or a subsection thereof to produce second search results without loading the second index section; and
   (h) code that when executed causes presenting to the first or second user the second search results of the search for the second search term.

19. The non-transitory medium claim 18, wherein at least one of the prefix databases of terms has the structure of a trie.

20. The non-transitory medium of claim 19, wherein at least one of the tries has the structure of a radix trie.

21. The non-transitory computer readable code of claim 18,
   wherein the accepting of the first search term occurs one character at a time so that there is a so-far entered prefix prior to the first search term being entered by the first user,
   wherein the loading of the first prefix is after the first prefix has been entered, and
   wherein the serverless function includes:
      code that when executed causes carrying out a search, using the loaded first index section, for the all search terms that have the so-far entered first prefix; and
      code that when executed causes at least one of the processors to cause presenting to the first user at least some of the search terms that have the so-far entered first prefix, such that the first user can select one of the presented search terms as the first search term.

22. The non-transitory computer-readable medium of claim 18, further comprising:
   code that when executed causes at least one of the processors to ascertain whether the determined first index section is larger than a predefined size; and
   code that when executed causes at least one of the processors, in response to the ascertaining that the first index section is larger than the predefined size:
      (I) to partition the determined first index section into first index subsections, each first index subsection containing all terms from the determined first index section that have a corresponding prefix of more characters than the corresponding prefix of the determined first index section; and
      (II) to determine a first index subsection to load for searching, the determining according to the prefix of the first search term,
         wherein the serverless function when executed loads the determined first index subsection, and searches for the first search term using the loaded first index subsection.

23. The non-transitory computer-readable medium of claim 22, further comprising:
   code that when executed causes at least one of the processors, in response to the ascertaining that the first index section is larger than the predefined size, to store the first index subsections as additional first index sections.

* * * * *